US011438945B2

(12) United States Patent
Tsuboi et al.

(10) Patent No.: US 11,438,945 B2
(45) **Date of Patent: *Sep. 6, 2022**

(54) TERMINAL DEVICE, BASE STATION DEVICE, REPORT TRANSMISSION METHOD PERFORMED BY TERMINAL DEVICE, AND REPORT RECEPTION METHOD PERFORMED BY BASE STATION DEVICE

(71) Applicant: SHARP KABUSHIKI KAISHA, Sakai (JP)

(72) Inventors: Hidekazu Tsuboi, Sakai (JP); Katsunari Uemura, Sakai (JP); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 221 days.

This patent is subject to a terminal disclaimer.

(21) Appl. No.: 16/943,590

(22) Filed: Jul. 30, 2020

(65) Prior Publication Data

US 2020/0359438 A1 Nov. 12, 2020

Related U.S. Application Data

(63) Continuation of application No. 15/750,834, filed as application No. PCT/JP2016/073188 on Aug. 5, 2016, now Pat. No. 10,750,554.

(30) Foreign Application Priority Data

Aug. 7, 2015 (JP) ................................ 2015-156694

(51) Int. Cl.
*H04W 72/12* (2009.01)
*H04L 12/26* (2006.01)
(Continued)

(52) U.S. Cl.
CPC .......... *H04W 76/14* (2018.02); *H04W 8/005* (2013.01); *H04W 24/10* (2013.01); *H04W 48/12* (2013.01); *H04W 72/042* (2013.01)

(58) Field of Classification Search
CPC ..... H04W 76/14; H04W 24/10; H04W 48/12; H04W 72/1247; H04W 72/042;
(Continued)

(56) References Cited

U.S. PATENT DOCUMENTS

2009/0232118 A1 9/2009 Wang et al.
2009/0274086 A1 11/2009 Petrovic et al.
(Continued)

FOREIGN PATENT DOCUMENTS

JP 2010-506446 A 2/2010
JP 2011-517883 A 6/2011

OTHER PUBLICATIONS

3GPP TS 36.331 V12.6.0 (Jun. 2015) 3rd Generation Partnership Project; Technical Specification Group Radio Access Network; Evolved Universal Terrestrial Radio Access (E-UTRA); Radio Resource Control (RRC); Protocol specification (Release 12).
(Continued)

*Primary Examiner* — Edan Orgad
*Assistant Examiner* — Vanneilian Lalchinthang
(74) *Attorney, Agent, or Firm* — ScienBiziP, P.C.

(57) ABSTRACT

A terminal device, a base station device, a communication system, a measurement method, and an integrated circuit, which are capable of efficiently performing Sidelink Direct Discovery, are provided. In the terminal device, a reception unit is configured to receive an RRC connection reconfiguration message including a first configuration related to Sidelink Direct Discovery, and in a case where the first configuration includes frequency information, to attempt to acquire configuration information about monitoring of a
(Continued)

Sidelink Direct Discovery announcement at a frequency indicated by the frequency information, using a timer configured to count a predetermined time and while the timer is counting, by acquiring system information to be broadcast at the frequency.

4 Claims, 7 Drawing Sheets

(51) Int. Cl.
*H04W 76/14* (2018.01)
*H04W 8/00* (2009.01)
*H04W 48/12* (2009.01)
*H04W 24/10* (2009.01)
*H04W 72/04* (2009.01)

(58) Field of Classification Search
CPC ....... H04W 8/005; H04W 4/70; H04W 88/02; H04W 76/023; H04L 43/028
USPC .......................................................... 370/329
See application file for complete search history.

(56) References Cited

U.S. PATENT DOCUMENTS

2010/0022250 A1 1/2010 Petrovic et al.
2014/0328329 A1 11/2014 Novlan et al.
2016/0028572 A1* 1/2016 Suzuki ................ H04W 72/042 370/281
2016/0044678 A1* 2/2016 Kwon ................... H04W 76/14 370/329
2017/0048922 A1 2/2017 Lee et al.
2017/0055264 A1* 2/2017 Seo ....................... H04W 72/04
2017/0099581 A1* 4/2017 Yang ..................... H04W 8/005
2017/0150314 A1* 5/2017 Hwang ................... H04W 4/06
2017/0303322 A1* 10/2017 Watfa .................... H04W 28/06
2018/0084465 A1* 3/2018 Jung ..................... H04W 36/08
2018/0092112 A1* 3/2018 Jung ..................... H04W 88/02
2019/0110327 A1* 4/2019 Yi ......................... H04W 76/14

OTHER PUBLICATIONS

Interdigital Communications, "On ProSe Discovery for inter-carrier and inter-PLMN", R2-152682, 3GPP TSG-RAN WG2 #90 Fukuoka, Japan, May 25-29, 2015.
Qualcomm Incorporated, "Revised WI: Enhanced LTE Device to Device Proximity Services", RP-150441, 3GPP TSG RAN Meeting #67, Shanghai, China, Mar. 9-12, 2014.
3GPP TS 36.300 V12.6.0 (Jun. 2015) 3rd Generation Partnership Project;Technical Specification Group Radio Access Network; Evolved Universal Terrestrial Radio Access (E-UTRA) and Evolved Universal Terrestrial Radio Access Network, (E-UTRAN); Overall description; Stage 2 (Release 12).
Non-Final Rejection dated Jun. 26, 2019 for U.S. Appl. No. 15/750,834.
Final Rejection dated Dec. 31, 2019 for U.S. Appl. No. 15/750,834.
Notice of Allowance dated Apr. 13, 2020 for U.S. Appl. No. 15/750,834.
Samsung, "Introduction of ProSe", R2-150716, 3GPP TSG-RAN2#89 Meeting, Athens, Greece, Feb. 9-13, 2015.

* cited by examiner

TERMINAL DEVICE, BASE STATION DEVICE, REPORT TRANSMISSION METHOD PERFORMED BY TERMINAL DEVICE, AND REPORT RECEPTION METHOD PERFORMED BY BASE STATION DEVICE

TECHNICAL FIELD

Embodiments of the present invention relate to techniques of a terminal device, a base station device, a communication system, a measurement method, and an integrated circuit configured to perform Sidelink Direct Discovery.

BACKGROUND ART

The 3rd Generation Partnership Project (3GPP), which is a standardization project, has standardized the Evolved Universal Terrestrial Radio Access (EUTRA), in which high-speed communication is achieved by adopting an Orthogonal Frequency-Division Multiplexing (OFDM) communication scheme and flexible scheduling on a given frequency and time basis called a resource block. EUTRA is also referred to as Long Term Evolution (LTE), in some cases.

Moreover, in 3GPP, Advanced EUTRA (also called LTE-A) for enabling higher-speed data transmission and having upper compatibility with EUTRA is studied.

In Advanced EUTRA, the introduction of direct communication between terminal devices (Device to Device (D2D)) is considered. In D2D, as services between terminal devices in close proximity to each other (Proximity based Services (ProSe)), a scheme to confirm (discover) whether the terminals are positioned in close proximity to each other (also called ProSe Discovery, D2D Discovery, or Sidelink Direct Discovery), a scheme by which the terminal devices perform data communication therebetween without passing through a base station device (also called ProSe Communication, ProSe Direct Communication, D2D Communication, D2D Direct Communication, or Sidelink Direct Communication), and the like are specified (see NPL 1), and further functional extensions are studied.

For example, schemes that are studied include a scheme for enabling the transmission (Sidelink Direct Discovery announcement), the reception (Sidelink Direct Discovery announcement monitoring), and the like of Sidelink Direct Discovery, even in an area outside the coverage of the network, even at a different frequency, even in an area of another Public Land Mobile Network (PLMN), or the like, and a scheme for enabling a terminal device at an coverage end of the network and a terminal device in an area outside the coverage, or the like to be connected to the network through communication by D2D with a terminal device inside the coverage of the network (see NPL 2 and NPL 3).

CITATION LIST

Non Patent Literature

NPL 1: 3GPP TS 36.300 V12.6.0 (2015-7) http://www.3gpp.org/DynaReport/36300.htm

NPL 2: RP-150441, Qualcomm, Revised WI: Enhanced LTE Device to Device Proximity Services http://www.3gpp.org/ftp/tsg_ran/TSG_RAN/TSGR_67/Docs/RP-150441.zip NPL 3: R2-152682, InterDigital, On ProSe Discovery for inter-carrier and inter-PLMN http://www.3gpp.org/ftp/tsg_ran/WG2_RL2/TSGR2_90/Docs/R2-152682.zip NPL 4: 3GPP TS 36.331 V12.6.0 (2015-7) http://www.3gpp.org/DynaReport/36331.htm

SUMMARY OF INVENTION

Technical Problem

NPL 3 describes a terminal device demanding a period of time (gap) while regular communication is discontinued so as to transmit or receive Sidelink Direct Discovery on another frequency, in another PLMN, or the like, the terminal device reporting a resource of the Sidelink Direct Discovery to a base station device so as to generate the gap, and the like. However, a specific method for acquiring a resource of Sidelink Direct Discovery, a specific method for reporting such a resource, and the like are neither disclosed nor suggested.

Embodiments of the present invention have been made in consideration of the above problems, and have an object to solve the above problems by providing techniques related to a terminal device, a base station device, a communication system, a measurement method, and an integrated circuit capable of efficiently performing Sidelink Direct Discovery.

Solution to Problem

In order to accomplish the object described above, the present invention provides the following measures. That is, a terminal device in an embodiment of the present invention is a terminal device, in which a reception unit receives an RRC connection reconfiguration message including a first configuration related to Sidelink Direct Discovery, and in a case of the first configuration including frequency information, the terminal device attempts to acquire configuration information on monitoring of a Sidelink Direct Discovery announcement at a frequency indicated by the frequency information using a timer configured to count a predetermined time during the stated timer time-counting, by acquiring system information being broadcast at the above-mentioned frequency.

Further, a base station device in an embodiment of the present invention is a base station device configured to communicate with a terminal device, in which a transmission unit transmits, including frequency information in a first configuration related to Sidelink Direct Discovery, an RRC connection reconfiguration message including the first configuration, and makes the terminal device acquire configuration information on monitoring of a Sidelink Direct Discovery announcement at a frequency indicated by the frequency information using a timer configured to count a predetermined time during the stated timer time-counting from system information being broadcast at the above-mentioned frequency.

Furthermore, a communication system in an embodiment of the present invention is a communication system where a terminal device and a base station device communicate with each other, in which the base station device transmits an RRC connection reconfiguration message including a first configuration related to Sidelink Direct Discovery, and the terminal device receives the RRC connection reconfiguration message including the first configuration, and attempts to acquire, in a case of the first configuration including frequency information, configuration information on monitoring of a Sidelink Direct Discovery announcement at a frequency indicated by the frequency information using a timer configured to count a predetermined time during the stated timer time-counting, by acquiring system information being broadcast at the above-mentioned frequency.

Moreover, a measurement method for a terminal device in an embodiment of the present invention is a measurement method applied to a terminal device, the method at least including the steps of: a reception unit receiving an RRC connection reconfiguration message encompassing a first configuration related to Sidelink Direct Discovery; and the terminal device attempting to acquire, in a case of the first configuration encompassing frequency information, configuration information on monitoring of a Sidelink Direct Discovery announcement at a frequency indicated by the frequency information using a timer configured to count a predetermined time during the stated timer time-counting, by acquiring system information being broadcast at the above-mentioned frequency.

In addition, an integrated circuit implemented in a terminal device in an embodiment of the present invention is an integrated circuit installed in the terminal device, in which a reception unit receives an RRC connection reconfiguration message including a first configuration related to Sidelink Direct Discovery, and in a case of the first configuration including frequency information, the stated integrated circuit makes the terminal device exhibit a function to attempt to acquire configuration information on monitoring of a Sidelink Direct Discovery announcement at a frequency indicated by the frequency information using a timer configured to count a predetermined time during the stated timer time-counting, by acquiring system information being broadcast at the above-mentioned frequency.

Advantageous Effects of Invention

As discussed above, according to the embodiments of the present invention, techniques related to a terminal device, a base station device, a communication system, a measurement method, and an integrated circuit are provided to be capable of efficiently performing Sidelink Direct Discovery.

DESCRIPTION OF EMBODIMENTS

Figure 1:
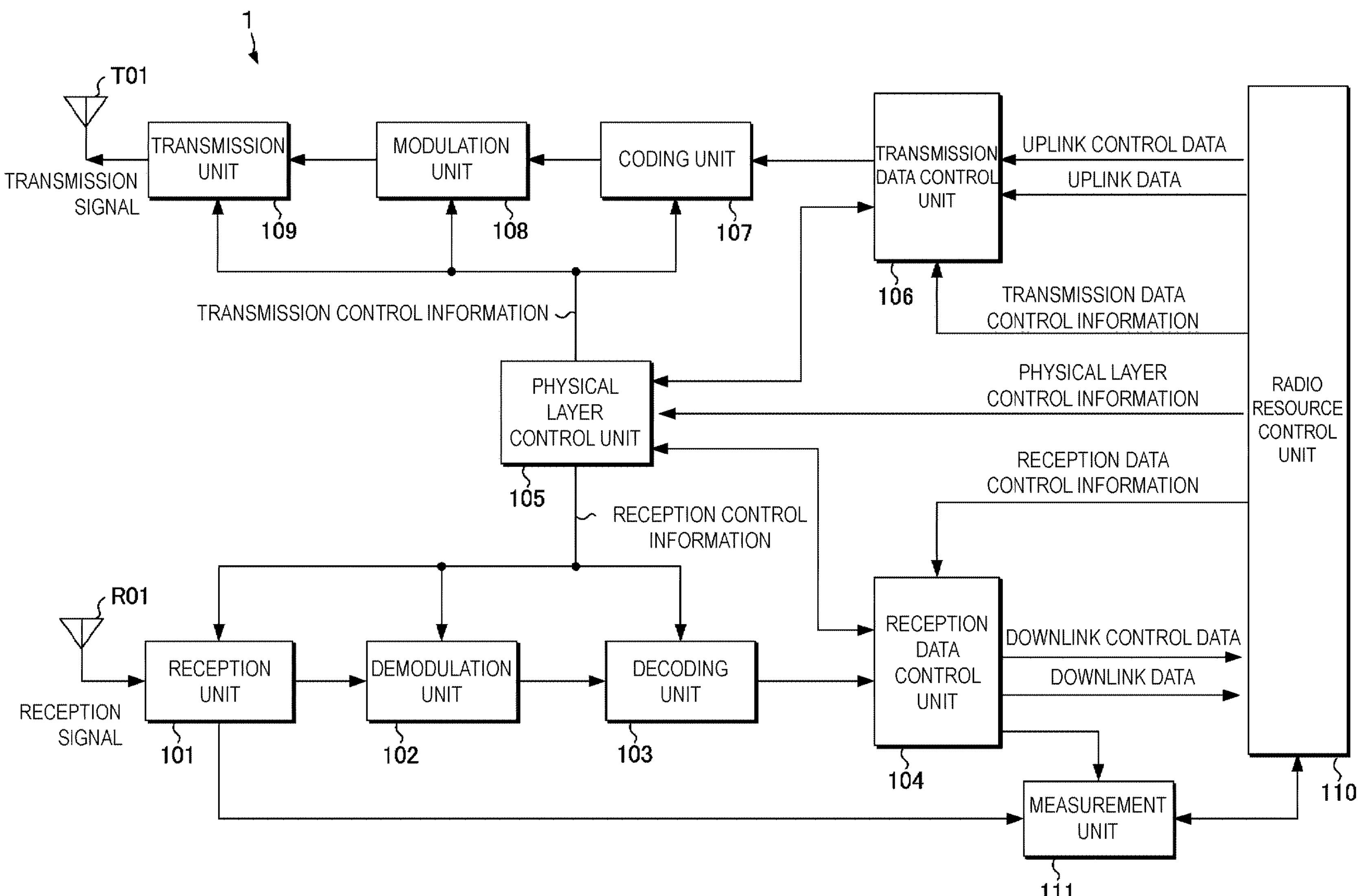
FIG. 1 is a block diagram illustrating an example of a schematic configuration of a terminal device according to an embodiment of the present invention.

Herein, embodiments are disclosed in consideration of representing the techniques of a terminal device, a base station device, a communication system, a measurement method, and an integrated circuit, which are capable of efficiently performing Sidelink Direct Discovery; however, the communication method that can be applied to the embodiments is not limited to a communication method compatible with EUTRA such as EUTRA or Advanced EUTRA.

For example, the techniques discussed herein can be used in various kinds of communication systems using Code Division Multiplexing Access (CDMA), Time Division Multiplexing Access (TDMA), Frequency Division Multiplexing Access (FDMA), Orthogonal FDMA (OFDMA), Single Carrier FDMA (SC-FDMA), and other access schemes. In this specification, "system" and "network" may be used synonymously.

The techniques related to the embodiments of the present invention will be described briefly below.

Channel/Signal

Channels of LTE (EUTRA) include a logical channel, a transport channel, and a physical channel. Channel denotes a medium used for transmission and reception of a signal, and a logical channel defines a type of data transmission service in which data is transmitted and/or received in a Medium Access Control (MAC) layer. The transport channel defines characteristics of the data transmitted via a radio interface and how the data is transmitted.

The physical channel denotes a physical medium carrying data which is transferred to a physical layer via the transport channel. In an embodiment of the present invention, the "physical channel" may be used as a synonym of "signal." As for the physical channel, in a communication system evolved from EUTRA (LTE, LTE-A), a new channel may be added, or a configuration (constitution) or format thereof may be changed or added; however, the description of each embodiment of the present invention will not be affected even when such an addition or change is performed, and the stated channel may be used as a channel used in the embodiments of the present invention.

In EUTRA, scheduling of a physical channel or a physical signal is managed by using a radio frame. One radio frame is 10 ms in length, and one radio frame includes 10 subframes. In addition, one subframe includes two slots (i.e., one subframe is 1 ms in length, and one slot is 0.5 ms in length). Moreover, scheduling is managed by using a resource block as a minimum unit of scheduling for allocating a physical channel. The resource block is defined by a certain frequency domain including a set of multiple subcarriers (e.g., 12 subcarriers) on a frequency axis and a domain including a certain transmission time slot (one slot).

The downlink in EUTRA will be described below. The downlink logical channels include a Broadcast Control CHannel (BCCH), a Paging Control CHannel (PCCH), a Common Control CHannel (CCCH), a Dedicated Control CHannel (DCCH), and a Dedicated Traffic CHannel (DTCH).

The Broadcast Control CHannel (BCCH) is a logical channel used to broadcast system information. The Paging Control CHannel (PCCH), which is a logical channel used to transmit paging information, is used when a network calls a terminal device, a change in system information is reported, or the like. The Common Control CHannel (CCCH), which is a logical channel used to transmit control information between a terminal device and the network, is used by a base station device when a state of the terminal device has not shifted to a state of having a Radio Resource Control (RRC) connection (RRC connection state (RRC_CONNECTED)) with the network in the downlink.

The Dedicated Control CHannel (DCCH) is a point-to-point bidirectional channel, and is a logical channel used to transmit dedicated control information between a terminal device and the network. The Dedicated Control CHannel (DCCH) may be used between a terminal device in an RRC connection state and a base station device. The Dedicated Traffic CHannel (DTCH) is a point-to-point bidirectional channel, is a channel dedicated to a certain single terminal device, and is a logical channel used to transfer (transmit) user information (unicast data).

The downlink transport channels include a Broadcast CHannel (BCH), a Paging CHannel (PCH), and a Downlink Shared CHannel (DL-SCH).

The Broadcast CHannel (BCH) is broadcast to the entire cell in a fixed and predefined format (Transport format). The Downlink Shared CHannel (DL-SCH) supports a Hybrid Automatic Repeat Request (HARD), dynamic adaptation modulation (link adaptation) control, dynamic or quasi-static resource allocation, and Discontinuous Reception (DRX). The Paging CHannel (PCH) is broadcast to the entire cell.

Downlink physical channels and physical signals in EUTRA will be described below.

Synchronization Signals include three kinds of Primary Synchronization Signals (PSSs) and Secondary Synchronization Signals (SSSs) including 31 kinds of codes that are interleaved in the frequency domain. Indicated are 504 patterns of cell identities (Physical Cell Identities (PCIs)) for identifying base station devices and frame timings for radio synchronization, by the combinations of the primary synchronization signals and the secondary synchronization signals. The terminal device identifies the physical cell ID of a received synchronization signal by cell search.

A downlink reference signal is classified into multiple types according to its use. For example, cell-specific RSs (Cell-specific reference signals (CRSs)) are pilot signals transmitted with given power from each cell and are downlink reference signals periodically repeated in the frequency domain and the time domain under a given rule. The terminal device receives the cell-specific RS, and thus the reception quality of each cell is measured. The terminal device is also capable of using a cell-specific RS as a reference signal for demodulation of a physical downlink control channel or a physical downlink shared channel transmitted at the same time as the cell-specific RS.

The sequence used for a cell-specific RS is a sequence distinguishable among the cells. The cell-specific RS may be transmitted via all the downlink subframes from the base station device or transmitted via only a downlink subframe specified by the base station device. Additionally, the terminal device may receive the cell-specific RS via all the downlink subframes or may receive it via only a downlink subframe specified by the base station device.

The downlink reference signal is also used for estimation of a downlink channel variation. A downlink reference signal used for estimation of downlink channel variation is referred to as "Channel State Information Reference Signals (CSI-RSs, CSI reference signals)". The CSI reference signal may not actually transmit a signal, or may be transmitted with zero power. On the other hand, CSI-RS for actually transmitting a signal may be referred to as Non-Zero Power Channel State Information Reference Signals (NZP CSI-RSs). Further, a downlink radio resource used for measuring interference components may be referred to as a Channel State Information-Interference Measurement Resource (CSI-IMR) or a CSI-IM resource.

A downlink reference signal individually configured for the terminal device is referred to as UE-specific Reference Signals (URSs) or a Demodulation Reference Signal (DMRS), and is referred to for a channel compensation process for demodulating a physical downlink control channel, an enhanced physical downlink control channel, or a physical downlink shared channel.

A Physical Broadcast CHannel (PBCH) is transmitted for the purpose of reporting (configuring) a Master information block (MIB) commonly used among the terminal devices within the cell. The base station device reports (transmits) a Master information block message including MIB on a physical broadcast channel. Information reported (configured) to the terminal device by the Master information block message, that is, information reported by MIB, includes a downlink frequency bandwidth, a system frame number, configuration information (configuration) of a physical channel (PHICH) about Hybrid ARQ, and the like.

The base station device transmits, to the terminal device, cell common information other than the Master information block using a System information block Type 1 (SIB1) message in which a subframe position and periodicity are statically pre-defined, and other types of System information messages (e.g., System information block Type 2 to Type n (where n is a natural number)) dynamically scheduled within a system information window (SI-window) specified by the System information block Type 1.

The Master information block message, the System information block Type 1 message, and the System information message are layer 3 messages (RRC messages). Note that in this specification, system information (broadcast information) refers to the RRC messages, or information (information elements) reported by the Master information block and the respective System information blocks, in some cases.

The System information message is reported using a physical downlink shared channel in a radio resource indicated by a physical downlink control channel, and one piece of the system information classified in accordance with usage thereof (Type 2 to Type n of System Information Block (SIB2 to SIBn (where n is a natural number)) is transmitted in the corresponding system information window.

As the system information, reported are a Cell Global Identifier (CGI), which indicates a cell-specific identifier, a Tracking Area Identifier (TAI) for managing a standby area in paging, random access configuration information (shared random access configuration information), timing adjustment information, shared radio resource configuration information for each cell, neighboring cell list information (Neighboring cell list) of same frequency for each cell (different frequency, different RAT), uplink access control information, resource information of Sidelink Direct Discovery, resource information of Sidelink Direct communication, and the like.

A Physical Downlink Control CHannel (PDCCH) is transmitted by using several OFDM symbols (e.g., 1 to 4 OFDM symbols) from the start of each subframe. An Enhanced Physical Downlink Control CHannel (EPDCCH) is a physical downlink control channel allocated to the OFDM symbols to which a Physical Downlink Shared CHannel (PDSCH) is allocated. PDCCH or EPDCCH is used for notifying each terminal device of radio resource allocation information according to scheduling determined by the base station device, control information indicating an adjustment amount for an increase or decrease in transmit power, and the like. In the following, even when the Physical Downlink Control CHannel (PDCCH) alone is described, both physical channels that is, PDCCH and EPDCCH, are included unless otherwise noted.

The terminal device needs to monitor a physical downlink control channel addressed to the terminal device itself and receive the physical downlink control channel addressed to the terminal device itself, before transmitting and receiving a layer-2 message (MAC-CE) and a layer-3 message (such as paging, system information, or the like), and thus acquires, from the physical downlink control channel, radio resource allocation information called uplink grant in a case of transmission and called downlink grant (also called downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above.

The Physical Downlink Shared CHannel (PDSCH) is also used to report, to the terminal device, a layer-3 message such as paging, system information, or the like, in addition to downlink data. Radio resource allocation information of the physical downlink shared channel is indicated (reported) by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The Broadcast CHannel (BCH) is mapped to the Physical Broadcast CHannel (PBCH). The Paging CHannel (PCH) and the Downlink Shared CHannel (DL-SCH) are mapped to the Physical Downlink Shared CHannel (PDSCH). The Physical Downlink Control CHannel (PDCCH) is used as the dedicated physical channel.

The Paging Control CHannel (PCCH) is mapped to the Paging CHannel (PCH) in the downlink. The Broadcast Control CHannel (BCCH) is mapped to the Broadcast CHannel (BCH) and the Downlink Shared CHannel (DL-SCH). The Common Control CHannel (CCCH), the Dedicated Control CHannel (DCCH), and the Dedicated Traffic CHannel (DTCH) are mapped to the Downlink Shared CHannel (DL-SCH).

The uplink in EUTRA will be described below. The uplink logical channels include a Common Control CHannel (CCCH), a Dedicated Control CHannel (DCCH), and a Dedicated Traffic CHannel (DTCH).

The Common Control CHannel (CCCH), which is a logical channel used to transmit control information between the terminal device and the network, is used by the terminal device in a case that a state of the terminal device has not shifted to a state of having a Radio Resource Control (RRC) connection with the network (RRC connection state, or RRC_CONNECTED) in the uplink (in other words, in a state of RRC idle, or RRC_IDLE).

The Dedicated Control CHannel (DCCH) is a point-to-point bidirectional channel, and is a logical channel used to transmit dedicated control information between a terminal device and the network. The Dedicated Control CHannel (DCCH) may be used between a terminal device in an RRC connection state and a base station device. The Dedicated Traffic CHannel (DTCH) is a point-to-point bidirectional channel, is a channel dedicated to a single terminal device, and is a logical channel used to transfer user information (unicast data).

The uplink transport channels include an UpLink Shared CHannel (UL-SCH) and a Random Access CHannel (RACH).

The UpLink Shared CHannel (UL-SCH) supports a Hybrid Automatic Repeat Request (HARD), dynamic adaptation modulation control, dynamic or quasi-static resource allocation, and Discontinuous Transmission (DTX). The Random Access CHannel (RACH) is used to transmit limited control information.

Uplink physical channels and physical signals in EUTRA will be described below.

The Physical Uplink Control CHannel (PUCCH) is used for a reception confirmation reply (Acknowledgment/Negative Acknowledgment (ACK/NACK) for downlink data transmitted by using the physical downlink shared channel, downlink channel state information (Channel State Information (CSI)), and an uplink radio resource allocation request (radio resource request, or a Scheduling Request (SR)).

The Physical Uplink Shared CHannel (PUSCH) mainly transmits uplink data and uplink control data and may also include control data such as CSI and ACK/NACK. Moreover, the Physical Uplink Shared CHannel is also used by the terminal device to notify the base station device of uplink control information as a layer-2 message and a layer-3 message, in addition to uplink data. Radio resource allocation information of the physical uplink shared channel is provided by a physical downlink control channel, in a similar manner to downlink.

An Uplink Reference Signal (also referred to as "uplink pilot signal", or "uplink pilot channel") includes a Demodulation Reference Signal (DMRS) to be used by the base station device to demodulate the Physical Uplink Control CHannel (PUCCH) and/or the Physical Uplink Shared CHannel (PUSCH), and a Sounding Reference Signal (SRS) to be mainly used by the base station device to estimate an uplink channel state. Moreover, Sounding Reference Signals are categorized into a periodic Sounding Reference Signal (Periodic SRS), which is transmitted periodically, and an aperiodic Sounding Reference Signal (Aperiodic SRS), which is transmitted when transmission is instructed by the base station device.

A Physical Random Access CHannel (PRACH) is a channel used to report (configure) a preamble sequence, and includes a guard time. The preamble sequence is configured such that the base station device is notified of the information with multiple sequences. For example, when 64 sequences are available, 6-bit information can be provided to the base station device. A physical random access channel is used by the terminal device as a means for accessing the base station device.

The terminal device uses the physical random access channel to request an uplink radio resource when no physical uplink control channel is configured or to request the base station device for transmission timing adjustment information (also referred to as Timing Advance (TA)) necessary for matching an uplink transmission timing to a reception timing window of the base station device, for example. Moreover, the base station device can request the terminal device to start a random access procedure, by using a physical downlink control channel.

The Common Control CHannel (CCCH), the Dedicated Control CHannel (DCCH), and the Dedicated Traffic CHannel (DTCH) are mapped to the UpLink Shared CHannel (UL-SCH) in the uplink.

The UpLink Shared CHannel (UL-SCH) is mapped to the Physical Uplink Shared CHannel (PUSCH). The Random Access CHannel (RACH) is mapped to the Physical Random Access CHannel (PRACH). The Physical Uplink Control CHannel (PUCCH) is used as the dedicated physical channel.

Next, description of Sidelink, which is used in communication between terminals (direct communication, direct discovery, and the like) in EUTRA or the like, will be given below. Sidelink logical channels include a Sidelink Broadcast Control CHannel (SBCCH) and a Sidelink Traffic CHannel (STCH).

The Sidelink Broadcast Control CHannel (SBCCH) is a logical channel used to carry broadcast information in the Sidelink Direct communication. The Sidelink Traffic Channel is a channel used to carry user data in the Sidelink Direct communication.

Sidelink transport channels include a SideLink Broadcast Channel (SL-BCH), a SideLink Discovery CHannel (SL-DCH), and a SideLink Shared CHannel (SL-SCH).

The Sidelink Broadcast CHannel (SL-BCH) is broadcast from a terminal device to another terminal device in a pre-defined transport format. The Sidelink Discovery CHannel (SL-DCH) is configured by a fixed size and pre-determined transport format, and supports scheduling by the base station device or resource allocation through the resource selection by the terminal device itself, and HARQ combining. The Sidelink Shared CHannel (SL-SCH) supports the scheduling by the base station device or the resource allocation through the resource selection by the terminal device itself, HARQ combining, and dynamic adaptation modulation (link adaptation) control.

Sidelink physical channels and physical signals in EUTRA will be described below.

A Physical Sidelink Broadcast CHannel (PSBCH) is used by the terminal device to broadcast information on the system, synchronization, or the like.

A Physical Sidelink Discovery CHannel (PSDCH) is used to carry a Sidelink Direct Discovery message from the terminal device.

A Physical Sidelink Control CHannel (PSCCH) is used to carry control information of Sidelink Direct communication from the terminal device.

A Physical Sidelink Shared CHannel (PSSCH) is used to carry data of the Sidelink Direct communication from the terminal device.

The Physical Sidelink Control CHannel (PSCCH) is used to report the resource used for the Physical Sidelink Shared CHannel (PSSCH), other transmission parameters, or the like.

A reference signal (Sidelink reference signal) for demodulation of PSDCH, PSCCH, and PSSCH has a similar structure to the structure of DMRS of the uplink reference signal, and is allocated to a specific symbol of a slot to which each of the physical channels is allocated.

A SideLink Synchronization Signal (SLSS) is used to achieve synchronization with a terminal device outside the network coverage. The Sidelink Synchronization Signal is configured with two synchronization signals including a Primary Sidelink Synchronization Signal (PSSS) and a Secondary Sidelink Synchronization Signal (SSSS). The Primary Sidelink Synchronization Signal can take two kinds of sequences and the Secondary Sidelink Synchronization Signal can take 168 kinds of sequences, and thus 336 patterns of identifiers (SLSS IDs) can be provided by being transmitted in sets. SLSS IDs have values from 0 to 335. SLSS ID Sidelink Synchronization Signals of 0 to 167 are used in a case where a Sidelink Synchronization Signal is transmitted based on a synchronization timing of the base station device, and SLSS ID Sidelink Synchronization Signals of 168 to 335 are used in a case of not based on the synchronization timing of the base station device.

Detailed descriptions of other physical channels or physical signals will be omitted, because they are not related to the embodiments of the present invention.

Radio Network

A communicable range (communication area) at each frequency controlled by the base station device is assumed to be a cell. Here, the communication area covered by the base station device may be different in size and shape for each frequency. Moreover, the covered area may be different for each frequency.

The terminal device operates assuming the inside of a cell as a communication area. When the terminal device moves from one cell to another cell, the terminal device moves to an appropriate different cell through a cell re-selection procedure at the time of having no radio connection (also called an idle state, or an RRC_IDLE state) and through a handover procedure at the time of having radio connection (also called a connected state, or an RRC_CONNECTED state). A suitable cell usually means a cell that is determined that access from the terminal device is not prohibited based on information specified by the base station device and that has a downlink reception quality satisfying a given condition.

The base station device manages a cell that is an area where terminal devices are capable of communicating with each other, for each frequency. A single base station device may manage multiple cells.

When a terminal device is capable of communicating with a certain base station device, the cell configured to be used for the communication with the terminal device is referred to as "serving cell" while the other cells not used for the communication are referred to as "neighboring cell", among the cells of the base station device.

Radio Protocol Structure

Figure 4:
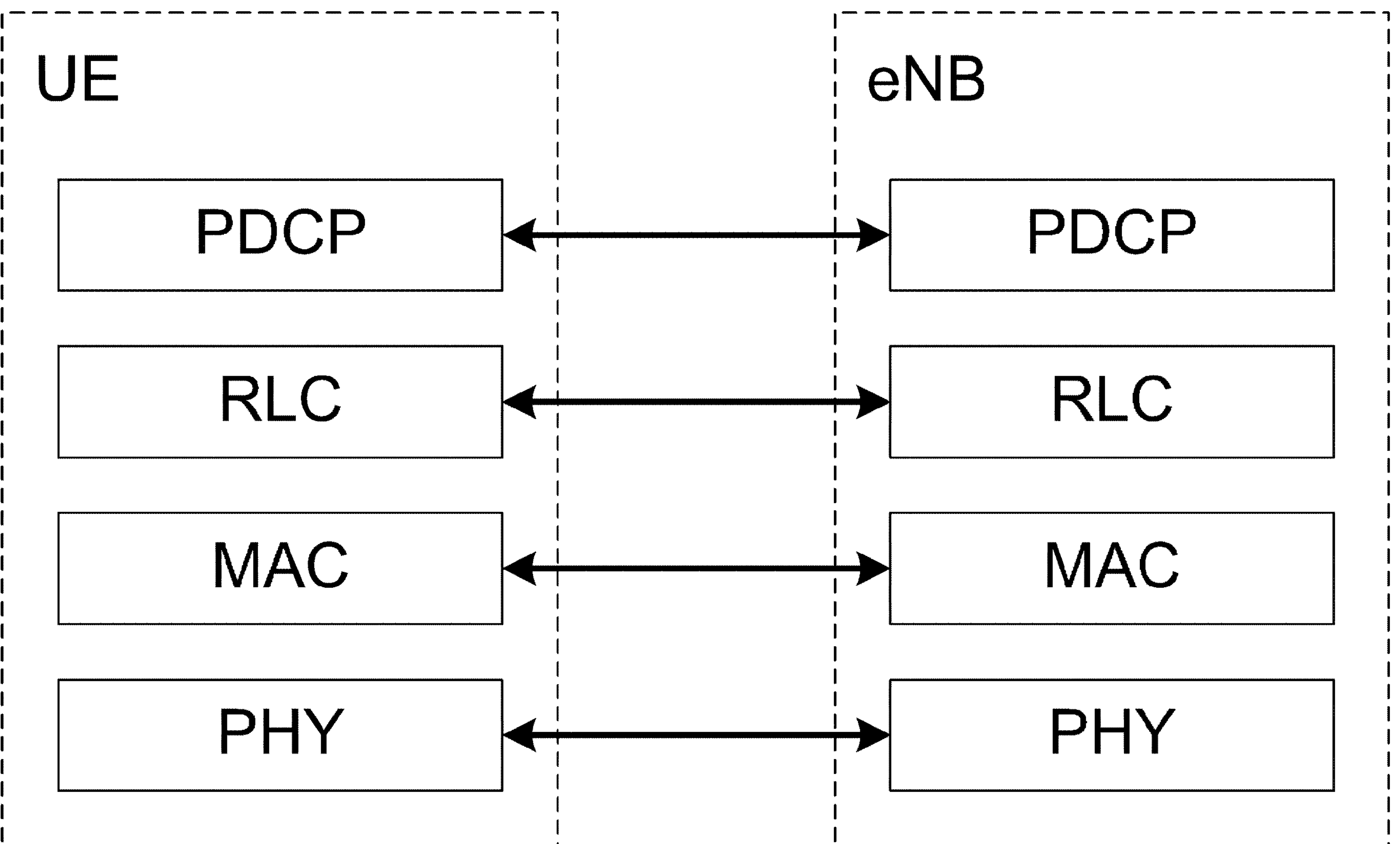
FIG. 4 is a diagram illustrating a protocol stack of a User-Plane or U-Plane (UP) according to an embodiment of the present invention.
Figure 5:
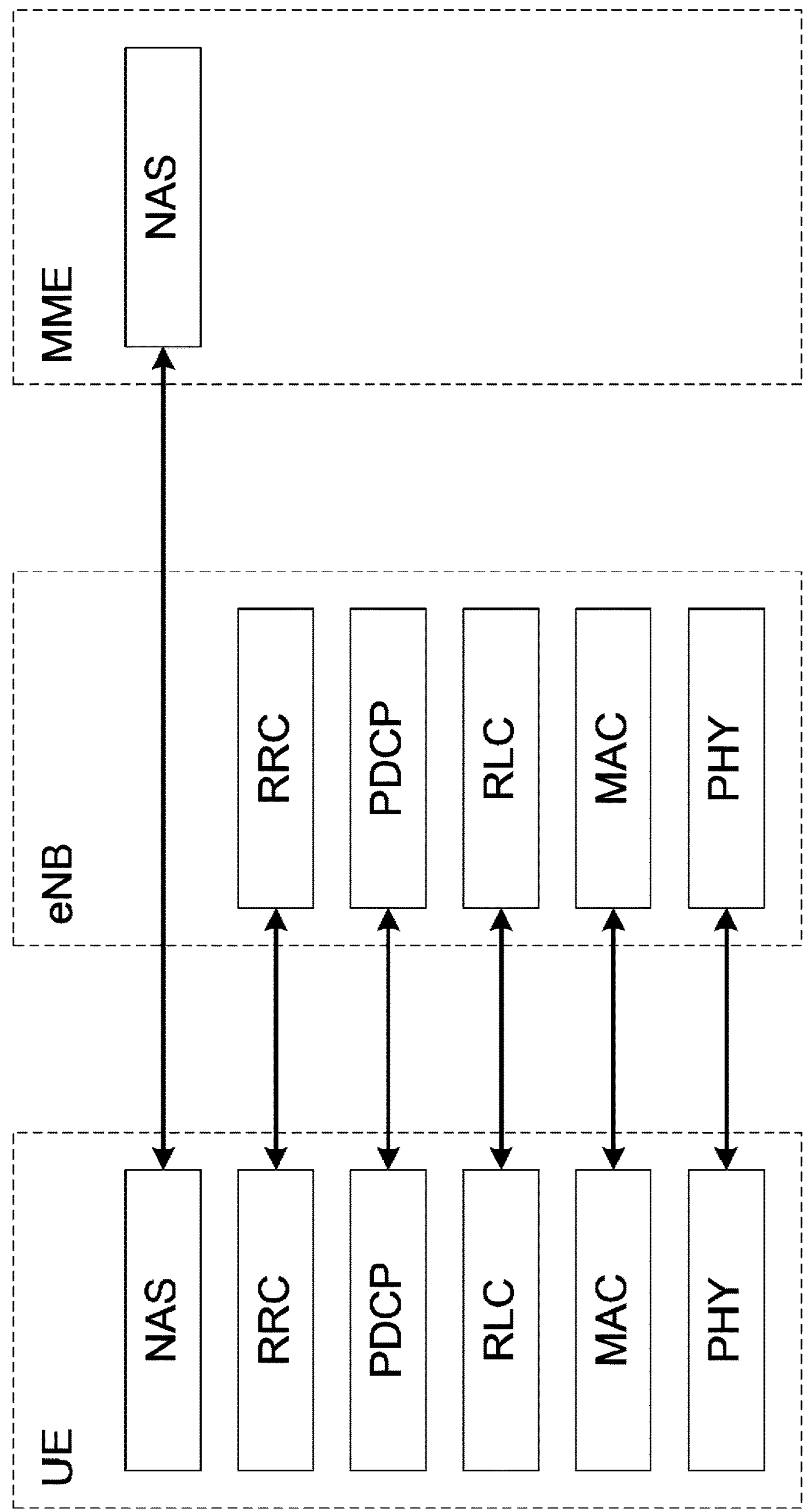
FIG. 5 is a diagram illustrating a protocol stack of a Control-Plane or C-Plane (CP) according to an embodiment of the present invention.

FIG. 4 is a diagram illustrating a protocol stack of a User-Plane or U-Plane (UP) handling user data of a terminal device and a base station device, in a radio network (EUTRAN) of EUTRA. FIG. 5 is a diagram illustrating a protocol stack of a Control-Plane or C-Plane (CP) handling control data.

In FIGS. 4 and 5, a Physical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal device and the base station device.

The MAC layer maps various logical channels to the various transport channels. The MAC layer is connected with a Radio Link Control layer (RLC layer), which is a higher layer, via the logical channels. The logical channels are roughly classified depending on the type of the transmitted information, specifically, classified into the control channels transmitting the control information and the traffic channels transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs segmentation or concatenation of the data received from the higher layer to adjust its data size so that a lower layer can appropriately transmit the data. The RLC layer also has a function to guarantee Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-Plane protocol stack. The RRC layer performs configuration and reconfiguration of Radio Bearers (RBs) to control the logical channels, the transport channels, and the physical channels. RBs are classified into a Signaling Radio Bearer (SRB) and a Data Radio Bearer (DRB), and SRB is used as a path for transmitting an RRC message, which is the control information. DRB is used as a path for transmitting the user data. RBs are configured between the RRC layers of the base station device and the terminal device.

The PHY layer corresponds to a physical layer as the first layer in the layered structure of the generally known Open Systems Interconnection (OSI) model. The MAC layer, the RLC layer, and the PDCP layer correspond to a data link layer as the second layer in the OSI model. The RRC layer corresponds to a network layer as the third layer in the OSI model.

Signalling protocols used between the network and a terminal device are divided into an Access Stratum (AS) protocol and a Non-Access Stratum (NAS) protocol. For example, the protocol in the RRC layer and its lower layers is the Access Stratum protocol used between the terminal device and the base station device. Further, the protocol in Connection Management (CM), Mobility Management (MM), or the like of the terminal device is the Non-Access Stratum protocol, and is used between the terminal device and a core network (CN). For example, as illustrated in FIG. 5, communication using the Non-Access Stratum protocol is transparently performed via the base station device between the terminal device and a Mobility Management Entity (MME).

Random Access Procedure

The random access procedure will be described below. The random access procedure include two access procedures of a Contention based Random Access procedure and a Non-contention based Random access procedure.

The Contention based Random Access procedure is a random access procedure where a collision possibly occurs between the mobile station devices, and is performed for a scheduling request at an initial access from a state of not connecting (communicating) with the base station device, or in a case that the uplink data transmission occurs in the mobile station device while connecting with the base station device but being out of uplink synchronization, or the like.

The Non-contention based Random Access procedure is a random access procedure where a collision does not occur between the mobile station devices, and the mobile station device is instructed by the base station device to start the random access procedure in a special case, such as a handover for quickly obtaining the uplink synchronization between the mobile station device and the base station device, when the base station device and the mobile station device are out of the uplink synchronization even though the base station device and the mobile station device are connected to each other, a case of the transmission timing of the mobile station device that is not valid, or the like. The Non-contention based Random Access procedure is instructed through a message of the Radio Resource Control (RRC) layer (Layer 3) and the control data of the Physical Downlink Control CHannel (PDCCH).

MAC Layer Function

A function of the MAC layer in the terminal device will be described below. The MAC layer has a function to map the logical channels to the transport channels. Further, the MAC layer has a function to generate transmission data from each logical channel in accordance with priority. This procedure is referred to as a Logical Channel Prioritization (LCP) procedure. In the basic LCP procedure, the transmission priority order of transmission data is determined in consideration of the priority order of each logical channel and a transmission bit rate (Prioritized Bit Rate (PBR)) to be transmitted within a constant period of time corresponding to QoS of the radio bearer, and the transmission data is generated starting from the data having the highest transmission priority order at the time of receiving the uplink grant. The MAC layer acquires, when connected to the base station device, information such as the logical channel number of each RB, the priority order of the logical channel, PBR, and the like from the RRC layer.

Measurement

Radio Resource Management (RRM) measurement in EUTRA will be described.

Figure 6:
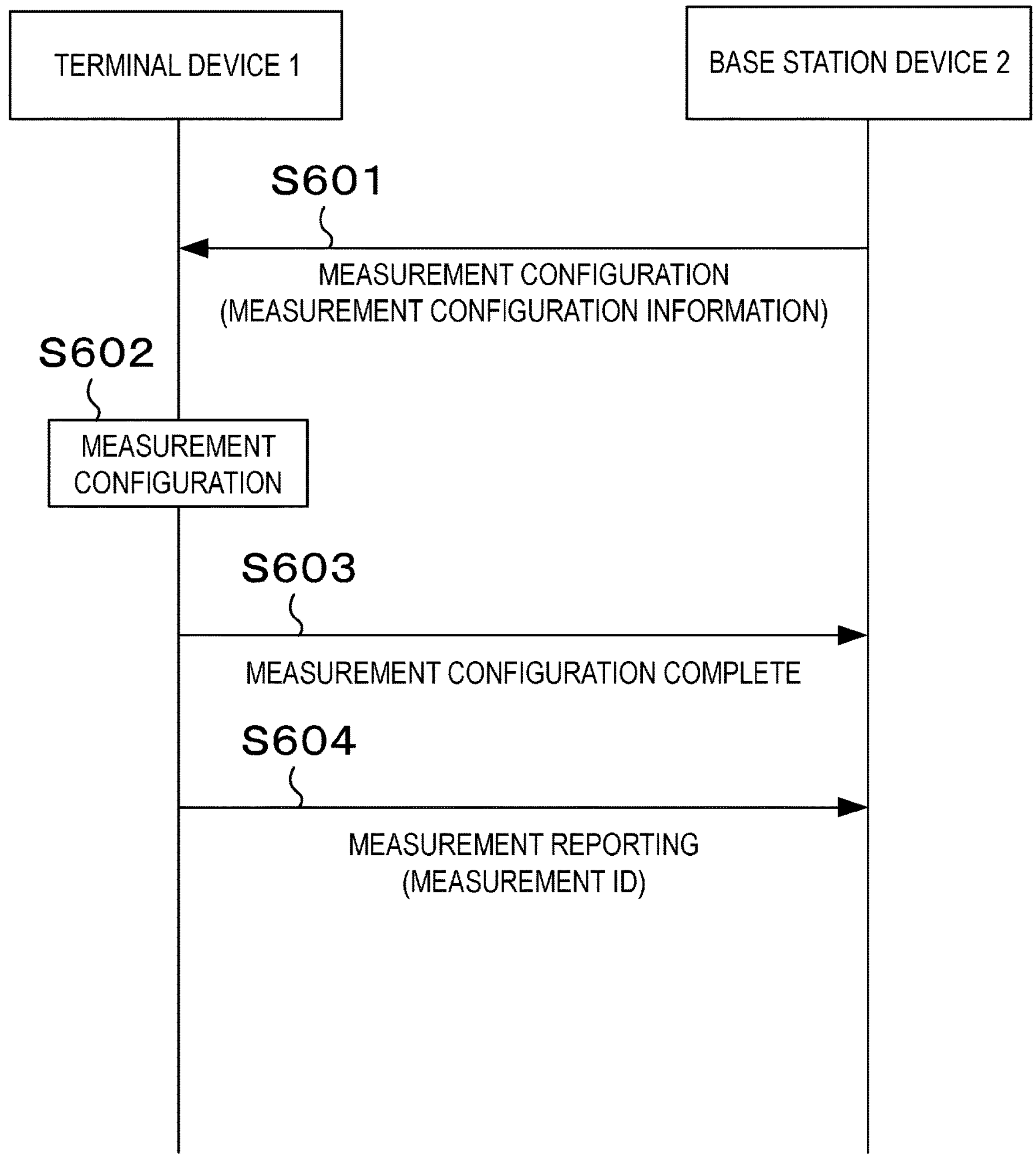
FIG. 6 is a sequence chart illustrating an example of a known RRM measurement configuration managing procedure.

FIG. 6 is a sequence chart diagram for illustrating a Radio Resource Management measurement configuration managing method for a terminal device and a base station device in EUTRA.

In an example of FIG. 6, it is assumed that two different frequencies of F1 and F2 are available to a base station device, as the frequencies supported by the base station device. A terminal device and the base station device are in a state of establishing a radio connection at the frequency F1. Here, the base station device transmits, to the terminal device, a message (measurement configuration message) including a measurement configuration (step S601), in order to cause the terminal device to measure the reception quality of a cell in communication (serving cell) and other cells (neighboring cells). The measurement configuration message includes at least one piece of measurement configuration information for each of the frequencies (frequencies F1 and F2) to be measured. The measurement configuration information is configured with a measurement ID, a measurement object, a measurement object ID corresponding to the measurement object, a reporting configuration including trigger type measurement event (Event) information (to become a reporting trigger) or periodical measurement information, and a reporting configuration ID corresponding to the reporting configuration. Multiple reporting configuration IDs are configured to be linked to a single measurement object ID. Likewise, a single reporting configuration ID is configured to be linked to multiple measurement object IDs.

For example, a description will be given of a case in which two measurement objects (frequencies F1 and F2) and three reporting configurations are reported, and three measurement IDs are configured for the combinations of the above measurement objects and reporting configurations, with reference to FIG. 7.

The base station device assigns, to the frequency F1 and frequency F2 as measurement objects, an identifier 0 and an identifier 1, respectively, as the measurement object IDs, and reports this to the terminal device. Further, the base station device assigns reporting configurations including a reporting configuration 1, a reporting configuration 2, and a reporting configuration 3, with reporting configuration IDs including identifiers 0, 1, and 2, respectively, and reports such configurations to the terminal device. Furthermore, the base station device reports, to the terminal device, the measurement IDs, which are linked to the combinations of the measurement object identifiers and the reporting configuration identifiers.

Figure 7:
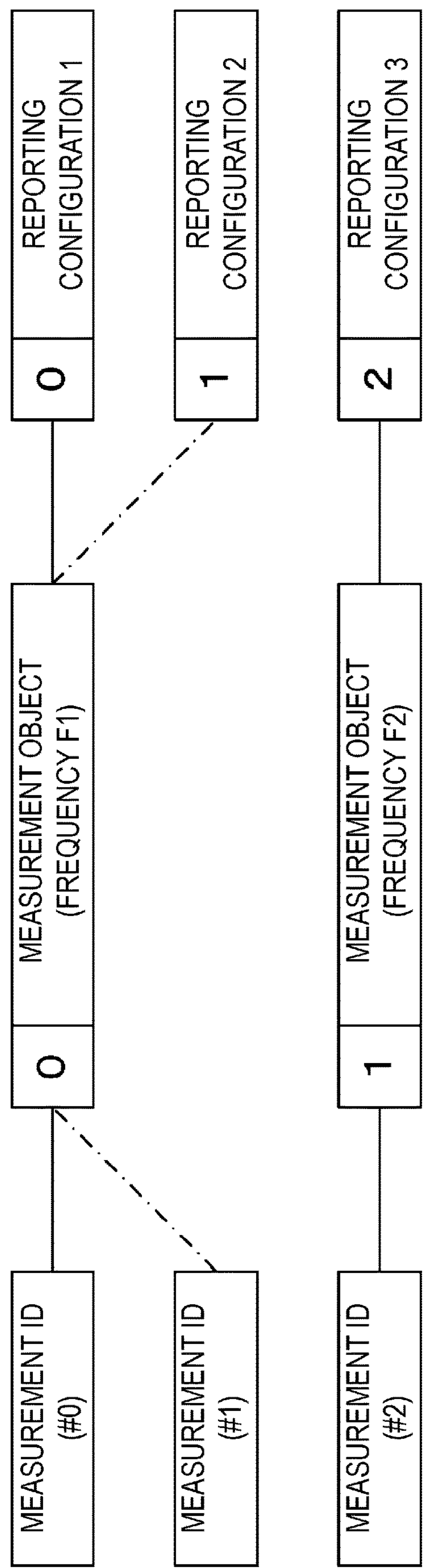
FIG. 7 is a diagram illustrating an example of a known RRM measurement configuration.

In FIG. 7, as a measurement ID #0, a combination of a measurement object with the identifier 0 (frequency F1), and the reporting configuration with the identifier 0 is specified. Likewise, a combination of the measurement object with the identifier 0 (frequency F1) and the reporting configuration with the identifier 1 is specified as a measurement ID #1, and a combination of the measurement object with the identifier 1 (frequency F2) and the reporting configuration with the identifier 2 is specified as a measurement ID #2.

The measurement event information is, for example, information configured with measurement events indicating the following situations and parameters to determine the stated situations: a situation in which the reception quality of a cell-specific reference signal of the serving cell becomes worse/better than a given threshold; a situation in which the reception quality of a cell-specific reference signal of the neighboring cell becomes worse than that of the serving cell; a situation in which the reception quality of the neighboring cell becomes better than the given threshold, and the like, for example. In the parameters, pieces of information such as a threshold, an offset value, a time necessary for a measurement event to hold, and the like are configured. In NPL 4, for example, it is defined as a measurement event A4 that measurement reporting is triggered when the reception quality of a neighboring cell becomes better than a threshold (enter) (or when the reception quality is distanced from the above state (leave)).

The periodical measurement information includes purposes of the measurement, and the terminal device is notified of the following information: for example, the measurement is intended to report a cell of the highest reception power; the measurement is intended to acquire a cell global identifier included in the system information being broadcast in a cell of the measurement object frequency; and the like. In a case where the measurement is intended to acquire a cell global identifier, information telling from which cell a cell global identifier as the measurement object should be acquired is also included. In the case where the measurement is intended to acquire a cell global identifier, a value of a timer for the measurement (for example, a timer T321) is configured based on a Radio Access Technology (RAT), a multiplexing method, or the like to be a measurement object, and time counting of the timer is started. When the time counting of the stated timer expires, or when the measurement is completed before the expiration of the timer, measurement reporting is triggered.

In step S602, the terminal device stores (retains) the measurement configuration information configured from the base station device as internal information, and thereafter starts measurement processing. Specifically, the terminal device manages the measurement IDs, the measurement object IDs, and the reporting configuration IDs in the manner in which these are related to one another to be integrally linked as discussed above, and starts the measurement based on the measurement information corresponding to each ID. In a case that these three IDs are integrally linked, the case is considered to be valid and the related measurement is started; in a case that these three IDs are not integrally linked (in a case of any one of the IDs being not configured), the case is considered to be invalid and the related measurement is not started. Then, in a case where the measurement configuration information is configured without any error, the terminal device transmits a message indicating the completion of the measurement configuration (a measurement configuration complete message) to the base station device in step S603.

Subsequently, in the terminal device, in a case where any one of the measurement event and the periodical measurement having been configured satisfies the condition in accordance with the parameters, the measurement reporting is triggered and a measurement reporting message is transmitted to the base station device (step S604).

Hereinafter, appropriate embodiments of the present invention will be described in detail with reference to the drawings while taking the above-discussed items into consideration. In the description of the embodiments of the present invention, in a case where it is determined that specific description on the known functions, configurations, and the like related to the embodiments of the present invention makes the spirit of the embodiments of the present invention unclear, detailed description thereof will be omitted.

First Embodiment

A first embodiment of the present invention will be described below.

FIG. 1 is a block diagram illustrating an example of a terminal device 1 according to a first embodiment of the present invention. The terminal device 1 includes at least a reception unit 101, a demodulation unit 102, a decoding unit 103, a reception data control unit 104, a physical layer control unit 105, a transmission data control unit 106, a coding unit 107, a modulation unit 108, a transmission unit 109, a radio resource control unit 110, and a measurement unit 111. "Units" in the drawing refers to constituent elements to provide the functions and the procedures of the terminal device 1, which are also represented by the terms such as a section, a circuit, a constituting device, a device, a unit, and the like.

The radio resource control unit 110 is a block configured to perform respective functions of the Radio Resource Control (RRC) layer to manage radio resource control of the terminal device 1. The reception data control unit 104 and the transmission data control unit 106 are blocks configured to perform respective functions of the Medium Access Control (MAC) layer, the Radio Link Control (RLC) layer, and the Packet Data Convergence Protocol (PDCP) layer that manage the data link layer.

The terminal device 1 may include a multiple number of parts or all of the reception-sequence blocks (the reception unit 101, the demodulation unit 102, the decoding unit 103) and the transmission-sequence blocks (the coding unit 107, the modulation unit 108, the transmission unit 109) in order to support carrier aggregation and/or multiple frequencies (frequency bands, frequency band widths) by D2D or transmission and/or reception processing in the same subframe of the cell.

Regarding the reception processing of the terminal device 1, reception data control information is inputted to the reception data control unit 104 from the radio resource control unit 110, and physical layer control information as control parameters to control the respective blocks is inputted to the physical layer control unit 105 from the radio resource control unit 110. The physical layer control information is information including a parameter configuration necessary for radio communication control of the terminal device 1 and including reception control information and transmission control information.

The physical layer control information is configured by a radio connection resource configuration transmitted, in a dedicated manner, to the terminal device 1 from a base station device 2, cell-specific broadcast information, system parameters, or the like, and is outputted to the physical layer control unit 105 by the radio resource control unit 110 as needed. The physical layer control unit 105 appropriately outputs the reception control information as control information about the reception to the reception unit 101, the demodulation unit 102, and the decoding unit 103.

The reception control information includes, as downlink scheduling information, information such as reception frequency band information, reception timings associated with physical channels and physical signals, a multiplexing method, radio resource control information, and the like. The reception data control information is control information of the downlink including DRX control information, multicast data reception information, downlink retransmission control information, and the like, and includes control information about each downlink in the MAC layer, the RLC layer, and the PDCP layer.

The reception signal is received by the reception unit 101. The reception unit 101 receives the signal from the base station device 2 in accordance with the frequency and frequency band reported with the reception control information. The received signal is outputted to the demodulation unit 102. In addition, a synchronization signal, reference signal, and the like received by the reception unit 101 are outputted to the measurement unit 111. The demodulation unit 102 demodulates the signal. The demodulation unit 102 outputs, to the decoding unit 103, the signal that has been demodulated. The decoding unit 103 decodes the inputted signal, and outputs the respective decoded data (also called downlink data and downlink control data, and downlink transport blocks) to the reception data control unit 104. Further, MAC control elements transmitted along with the respective data from the base station device 2 are also decoded in the decoding unit 103, and the related data is outputted to the reception data control unit 104.

The reception data control unit 104 performs control on the physical layer control unit 105 based on the received MAC control elements (e.g., cell activation/inactivation, DRX control, transmission timing adjustment, and the like), buffering of the respective decoded data, error correction control on the retransmitted data (HARD), and the like. Of the data respectively inputted to the reception data control unit 104, the related data is outputted (transferred) to the radio resource control unit 110 and/or the measurement unit 111.

The measurement unit 111 measures the reception power, reception quality, and the like using a synchronization signal, reference signal, or the like inputted from the reception unit 101 based on parameters necessary for the measurement (e.g., the measurement object, reporting configuration, and the like) having been inputted from the radio resource control unit 110, and then determines whether the measurement result satisfies the condition to trigger measurement reporting. In a case that the measurement is intended to acquire system information related to Sidelink Direct Discovery, the measurement unit 111 may operate to acquire the system information related to the Sidelink Direct Discovery from the data inputted from the reception data control unit 104 and include the acquired system information in the measurement reporting.

In addition, the measurement unit 111 may measure, as a synchronization signal inputted from the reception unit 101, not only a synchronization signal transmitted by the base station device 2 but also a synchronization signal (SLSS) transmitted by another terminal device 1 configured to perform a Sidelink Direct Discovery announcement.

Further, in the case that the measurement is intended to acquire the system information related to the Sidelink Direct Discovery, and in a case where the cell cannot be detected when time counting of the timer with a predetermined value being configured expires or the system information related to the Sidelink Direct Discovery cannot be acquired, the measurement unit 111 may operate to include system information related to the Sidelink Direct Discovery having been configured beforehand in the terminal device 1 in the measurement reporting.

Regarding the transmission processing of the terminal device 1, transmission data control information is inputted to the transmission data control unit 106 from the radio resource control unit 110, and the physical layer control information as the control parameters to control the respective blocks is inputted to the physical layer control unit 105 from the radio resource control unit 110. The physical layer control unit 105 appropriately outputs the transmission control information as control information about the transmission to the coding unit 107, the modulation unit 108, and the transmission unit 109. The transmission control information includes, as uplink scheduling information, information such as coding information, modulation information, transmission frequency band information, transmission timings associated with physical channels and physical signals, a multiplexing method, radio resource allocation information, and the like.

The transmission data control information is control information of the uplink including DTX control information, random access configuration information, uplink shared channel information, logical channel priority information, resource request configuration information, cell group information, uplink retransmission control information, a buffer status report, and the like. The radio resource control unit 110 may configure, in the transmission data control unit 106, multiple pieces of random access configuration information respectively corresponding to multiple cells.

Further, the radio resource control unit 110 manages transmission timing adjustment information and a transmission timing timer used for adjusting the uplink transmission timing, and manages a state of the uplink transmission timing (a transmission timing adjustment state or transmission timing non-adjustment state) for each cell (or for each cell group or TA group). The transmission timing adjustment information and the transmission timing timer are included in the transmission data control information.

The transmission data generated in the terminal device 1 (also referred to as uplink data, uplink control data, or an uplink transport block) is inputted to the transmission data control unit 106 at an arbitrary timing from the radio resource control unit 110. At this time, the transmission data control unit 106 calculates an amount of inputted transmission data (an uplink buffer amount). Further, the transmission data control unit 106 has a function to determine whether the inputted transmission data is data belonging to a Control-Plane or is data belonging to a User-Plane.

The transmission data control unit 106, when the transmission data is inputted, stores the stated transmission data in an uplink buffer inside the transmission data control unit 106 (not illustrated). Furthermore, the transmission data control unit 106 performs multiplexing and assembling based on the priority order of the transmission data stored in the uplink buffer or the like, so as to generate MAC PDU. Then, the transmission data control unit 106 determines whether a radio resource necessary to transmit the inputted transmission data is assigned to the terminal device 1. The transmission data control unit 106 selects, based on the radio resource assignment, one of the Physical Uplink Shared CHannel (PUSCH), a radio resource request using the Physical Uplink Control CHannel (SR-PUCCH), and a radio resource request using the physical random access channel, and then requests the physical layer control unit 105 to perform control processing to transmit the selected channel.

In addition, the transmission data control unit 106 creates a buffer status report based on whether the inputted transmission data is transmission data to the base station device 2 or is transmission data of data communication between the devices. The coding unit 107 appropriately codes the respective data in accordance with the transmission control information, and outputs the coded data to the modulation unit 108.

The modulation unit 108 appropriately performs modulation processing based on the channel structure transmitting the respective coded data. The transmission unit 109 maps the respective data that has been subjected to the modulation processing to a frequency domain, converts a signal in the frequency domain to a signal in a time domain, and sets the signal on a carrier of a predetermined frequency and performs power amplification. Further, the transmission unit 109 adjusts the uplink transmission timing in accordance with the transmission timing adjustment information for each cell (or for each cell group, or each TA group) inputted from the radio resource control unit 110. The Physical Uplink Shared CHannel to which the uplink control data is allocated can include, in addition to the user data, a layer-3 message (a radio resource control message, or an RRC message), for example.

In a case that the radio resource control unit 110 is so configured as to perform a Sidelink Direct Discovery announcement and/or a Sidelink Direct Discovery announcement monitoring (or stop the performing thereof) from an upper layer, the radio resource control unit 110 may operate to include, in Sidelink terminal information (Sidelink UE information) of the RRC message, information indicating that the Sidelink Direct Discovery announcement and/or the Sidelink Direct Discovery announcement monitoring is performed (of interest) or stopped (of no interest), information of the frequency and PLMN of the Sidelink Direct Discovery, information indicating that a gap for the Sidelink Direct Discovery announcement and/or the Sidelink Direct Discovery announcement monitoring is necessary at the above frequency, and the like.

The expression "a gap is necessary" refers to, for example, (1) a case in which an action (operation) of a regular terminal cannot perform a Sidelink Direct Discovery announcement monitoring (and/or cannot acquire system information related to the Sidelink Direct Discovery announcement monitoring), (2) a case in which the Sidelink Direct Discovery announcement monitoring (and/or the acquisition of system information related to the Sidelink Direct Discovery announcement monitoring) affects an action (operation) of a regular terminal, (3) a case in which the Sidelink Direct Discovery announcement monitoring (and/or the acquisition of system information related to the Sidelink Direct Discovery announcement monitoring) cannot be performed without the gap, or the like.

Although, in FIG. 1, other constituent elements of the terminal device 1, a transmission path of data (control information) between the constituent elements, and the like are omitted, it is apparent that the terminal device 1 is provided with multiple blocks, as constituent elements, including other functions necessary to operate as the terminal device 1. For example, on a higher side of the radio resource control unit 110, there exist a NAS layer part, an application layer part, and the like, to manage the control with the core network.

Figure 2:
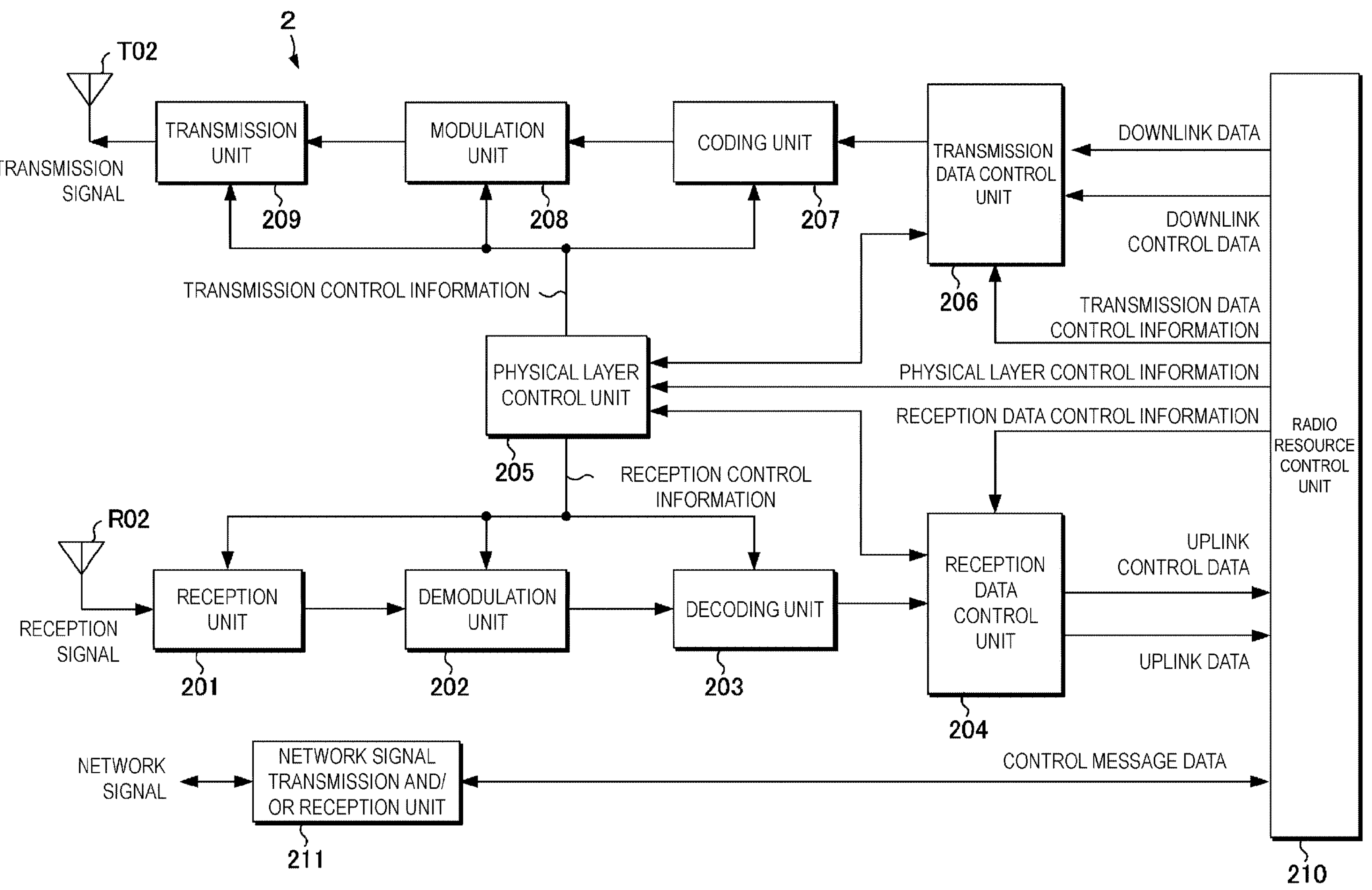
FIG. 2 is a block diagram illustrating an example of a schematic configuration of a base station device according to an embodiment of the present invention.

FIG. 2 is a block diagram illustrating an example of the base station device 2 according to the first embodiment of the present invention. The base station device 2 includes at least a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and/or reception unit 211. "Units" in the drawing refers to constituent elements to perform the functions and the procedures of the base station device 2, which are also represented by the terms such as a section, a circuit, a constituting device, a device, a unit, and the like.

The radio resource control unit 210 is a block configured to perform respective functions of the Radio Resource Control (RRC) layer to manage radio resource control of the base station device 2. The reception data control unit 204 and the transmission data control unit 206 are blocks configured to perform respective functions of the Medium Access Control (MAC) layer, the Radio Link Control (RLC) layer, and the Packet Data Convergence Protocol (PDCP) layer that manage the data link layer.

The base station device 2 may include a multiple number of parts or all of the reception-sequence blocks (the reception unit 201, the demodulation unit 202, the decoding unit 203) and the transmission-sequence blocks (the coding unit 207, the modulation unit 208, the transmission unit 209) in order to support multiple frequencies (frequency bands, frequency band widths) by carrier aggregation or the like, or transmission and/or reception processing in the same subframe of the cell.

The radio resource control unit 210 outputs downlink data and downlink control data to the transmission data control unit 206. The transmission data control unit 206 outputs, in a case that MAC control elements to be transmitted to the terminal device 1 are present, the MAC control elements and the respective data (the downlink data or downlink control data) to the coding unit 207. The coding unit 207 performs coding on the MAC control elements and the respective data having been inputted, and outputs them to the modulation unit 208. The modulation unit 208 modulates the coded signal.

The radio resource control unit 210 may operate to include, in a measurement configuration message to the terminal device 1, information indicating the acquisition of system information related to the Sidelink Direct Discovery as a measurement purpose of reporting configuration. Further, the radio resource control unit 210 may operate to include, in the measurement configuration message to the terminal device 1, a physical cell identity of the cell where the system information related to the Sidelink Direct Discovery is acquired as the measurement object information.

The signal modulated in the modulation unit 208 is inputted to the transmission unit 209. The transmission unit 209, after mapping the inputted signal to a frequency domain, converts the signal in the frequency domain to a signal in a time domain, sets the signal on a carrier of a predetermined frequency, and performs power amplification and signal transmission. The Physical Downlink Shared Channel to which the downlink control data is allocated typically configures a layer-3 message (RRC message).

The reception unit 201 converts a signal received from the terminal device 1 to a digital signal of baseband. In a case that cells with different multiple transmission timings are configured to the terminal device 1, the reception unit 201 receives the signals at different timings for each cell (or each cell group, or each TA group). The digital signal converted in the reception unit 201 is inputted to the demodulation unit 202 to be demodulated. The signal demodulated in the demodulation unit 202 is subsequently inputted to the decoding unit 203. The decoding unit 203 decodes the inputted signal, and outputs the respective decoded data (uplink data and uplink control data) to the reception data control unit 204. Further, MAC control elements transmitted along with the respective data from the terminal device 1 are also decoded in the decoding unit 203, and the related data is inputted to the reception data control unit 204.

The reception data control unit 204 performs control on the physical layer control unit 205 based on the received MAC control elements, buffering of the respective decoded data, error correction control on the retransmitted data (HARD), and the like. The respective data inputted to the reception data control unit 204 is inputted (transferred) to the radio resource control unit 210 as needed.

The physical layer control information necessary to control the above-discussed blocks is information including a parameter configuration necessary for radio communication control of the base station device 2 and including reception control information and transmission control information. The physical layer control information is configured by a higher-node network device (MME, a gate way device (SGW), OAM, or the like), system parameters, or the like, and outputted by the radio resource control unit 210 to the control unit 204 as needed.

The physical layer control unit 205 outputs the physical layer control information about the transmission, as the transmission control information, to the respective blocks of the coding unit 207, the modulation unit 208, and the transmission unit 209; and appropriately outputs the physical layer control information about the reception, as the reception control information, to the respective blocks of the reception unit 201, the demodulation unit 202, and the decoding unit 203.

The reception data control information includes control information on the uplink of the terminal device 1 with respect to the MAC layer, the RLC layer, and the PDCP layer of the base station device 2. The transmission data control information includes control information on the downlink of the terminal device 1 with respect to the MAC layer, the RLC layer, and the PDCP layer of the base station device 2. In other words, the reception data control information and the transmission data control information are configured for each terminal device 1.

The network signal transmission and reception unit 211 transmits (transfers) or receives control messages or user data between the base station devices 2 or between a higher-node network device (MME or SGW) and the base station device 2.

Although, in FIG. 2, other constituent elements of the base station device 2, a transmission path of data (control information) between the constituent elements, and the like are omitted, it is apparent that the base station device 2 is provided with multiple blocks, as constituent elements, including other functions necessary to operate as the base station device 2. For example, on a higher side relative to the radio resource control unit 210, there exist a Radio Resource Management part, an application layer part, and the like.

Next, with reference to FIG. 3, an example of a procedure by the terminal device 1 for performing a Sidelink Direct Discovery announcement monitoring will be described below.

Figure 3:
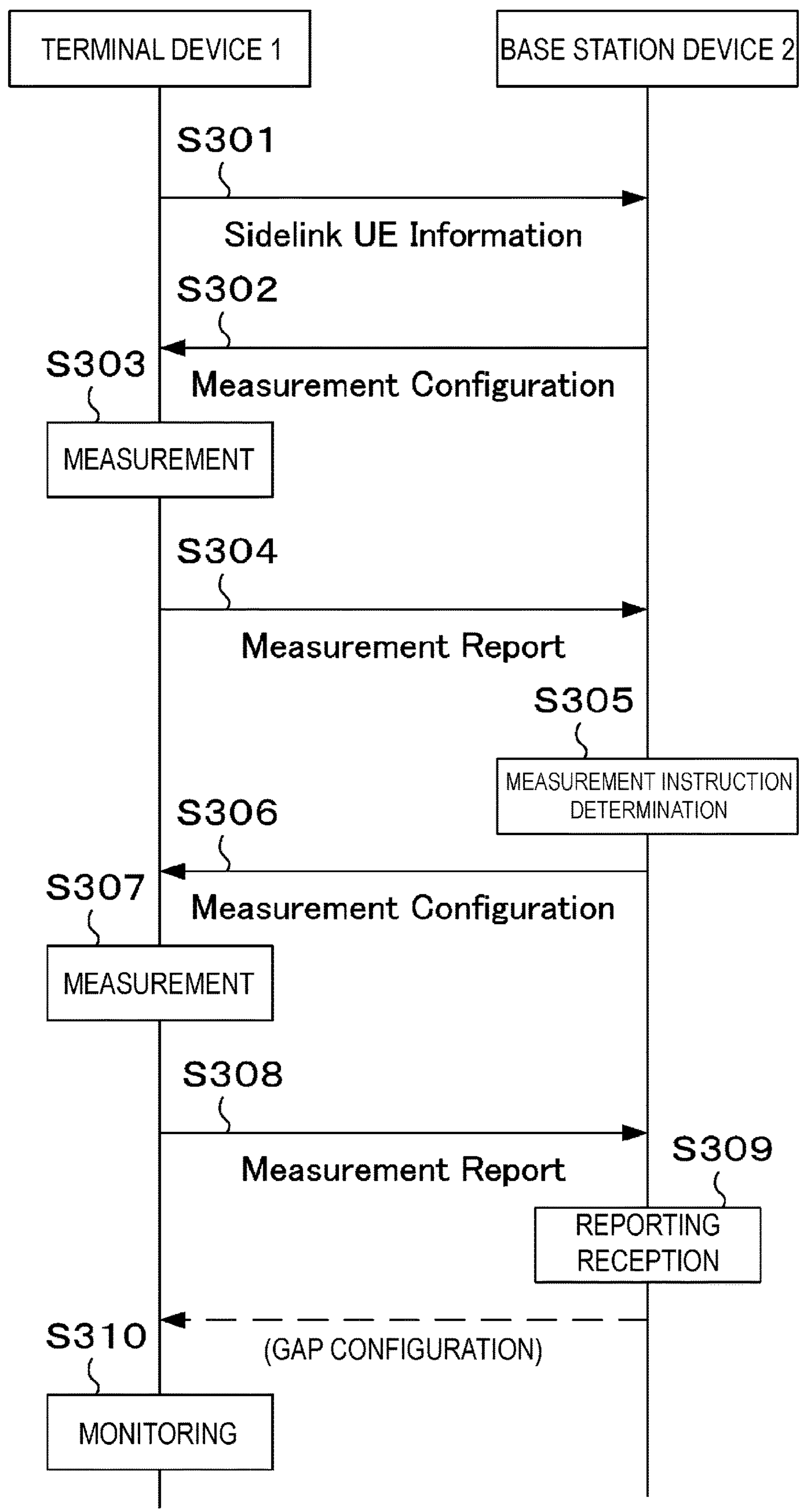
FIG. 3 is a diagram illustrating an example of a procedure for performing a Sidelink Direct Discovery announcement monitoring according to an embodiment of the present invention.

In FIG. 3, the terminal device 1 transmits Sidelink terminal information (Sidelink UE Information) to the base station device 2 in response to an indication from a higher layer, or the like (step S301). The Sidelink UE information includes one or more of the following pieces of information: a frequency of interest in receiving Sidelink Direct communication, a frequency of interest in transmitting the Sidelink Direct communication, a Sidelink Direct communication destination for requesting allocation of a dedicated resource from E-UTRAN, information indicating an interest in receiving a Sidelink Direct Discovery announcement, the number of Sidelink Discovery announcement resources for requesting allocation of dedicated resources from E-UTRAN, and the like. The Sidelink UE information may include information on a frequency of interest in receiving the Sidelink Direct Discovery announcement monitoring. For example, the Sidelink UE information may include information on a frequency of interest in receiving the Sidelink Direct Discovery announcement monitoring (e.g., Absolute radio-frequency channel number (ARFCN)) and a PLMN identifier of the stated frequency, and/or information indicating whether a period of time (gap) (Sidelink Discovery gap) is necessary; the Sidelink Discovery gap is a period of time during which a signal is not received in a serving cell in the Sidelink Direct Discovery announcement monitoring at the above-stated frequency (or measurement for the Sidelink Direct Discovery announcement monitoring). In a case that an indication to perform the monitoring of Sidelink Direct Discovery announcement at a single or multiple frequencies used in the Sidelink Direct Discovery announcement included in an inter-frequency Discovery frequency list (in a case included in a System information block Type 19 (SIB19)) is configured in a higher layer, and in a case where the Sidelink Discovery gap is needed in the monitoring of the Sidelink Direct Discovery announcement at least one frequency, the terminal device 1 may include, in the Sidelink UE information, information on the frequency of interest in receiving the Sidelink Direct Discovery announcement monitoring. Alternatively, in a case that an indication to perform the monitoring of a Sidelink Direct Discovery announcement at another PLMN instead is configured in a higher layer, and in a case where the Sidelink Discovery gap is needed in the monitoring of the Sidelink Direct Discovery announcement at least one frequency, the terminal device 1 may include, in the Sidelink UE information, information on the frequency of interest in receiving the Sidelink Direct Discovery announcement monitoring. With this, the base station device 2 can determine the configuration with respect to the terminal device 1 while taking into consideration the received information.

The transmission of the Sidelink UE information may be initiated in a case where the System information block Type 19 is broadcast in a primary cell and in a case where information on the frequency at which the monitoring of Sidelink Direct Discovery announcement is to be performed is not included in the information about the Sidelink Direct Discovery transmitted last in time, or in a case where the frequency, configured in a higher layer, at which the monitoring of the Sidelink Direct Discovery announcement is performed is changed from the information about the Sidelink Direct Discovery transmitted last in time.

The transmission of the Sidelink UE information may be initiated even when the frequency has not been changed in a case that, at the frequency where the monitoring of a Sidelink Direct Discovery announcement is performed, a synchronization source when the monitoring of the Sidelink Direct Discovery announcement being performed is changed from when the information about the Sidelink Direct Discovery was transmitted last in time. For example, the transmission may be initiated in a case of the synchronization source being changed to a different cell, a case of the synchronization source being changed from a cell to another terminal device 1 transmitting SLSS, a case of the synchronization source being changed from the another terminal device 1 transmitting SLSS to still another terminal device 1 or to a cell, or the like.

Alternatively, the information by which the base station device 2 can determine whether the gap is necessary may be reported by another RRC message (e.g., terminal capability information (UE Capability Information)).

The Sidelink UE information may include information indicating which of the communication in a serving cell and the Sidelink Direct Discovery communication should be prioritized.

Further, the Sidelink UE information may include not only the information on the Sidelink Direct Discovery announcement monitoring but also the information on the Sidelink Direct Discovery announcement in a similar manner.

The base station device 2 receives the Sidelink UE information from the terminal device 1. The base station device 2 transmits a measurement configuration message to the terminal device 1 (step S302). The base station device 2 may transmit the measurement configuration message based on the frequency information included in the Sidelink UE information, or may transmit the measurement configuration message based on some kind of determination.

For example, the measurement configuration may include, as a measurement object, the Sidelink Direct Discovery frequency contained in the Sidelink UE information; as for reporting configuration, in a case where a neighboring cell measurement result is better than a predetermined value (absolute value) included in the reporting configuration, triggering of a measurement reporting procedure may be configured.

For example, the measurement configuration may include, as a measurement object, the Sidelink Direct Discovery frequency contained in the Sidelink UE information; as for reporting configuration, in a case where a neighboring cell measurement result (of the measurement object frequency) is better than a predetermined value (absolute value) included in the reporting configuration (Entering condition), triggering of the measurement reporting procedure may be configured. In addition, in a case where the neighboring cell measurement result is distanced from being better than a predetermined value (absolute value) included in the reporting configuration (Leaving condition), triggering of the measurement reporting procedure may also be configured.

The terminal device 1 having received the measurement configuration message initiates the measurement based on the measurement configuration (step S303), and reports a measurement result to the base station device 2 in accordance with the reporting condition (step S304).

The base station device 2 receives the measurement reporting (step S305). The base station device 2 may instruct the terminal device 1 to perform further measurement, handover, or the like in consideration of the physical cell identity information of a cell detected at the Sidelink Direct Discovery frequency included in the measurement reporting, whether the gap for the Sidelink Direct Discovery at the stated frequency is necessary, or the like.

The base station device 2 configures, to the terminal device 1, the measurement to acquire system information (information related to the Sidelink Direct Discovery) being broadcast in the cell detected at the Sidelink Direct Discovery frequency (step S306). At this time, the measurement object of the measurement configuration may include the Sidelink Direct Discovery frequency and the physical cell identity of the object cell, periodical measurement may be configured as a trigger type in the reporting configuration, and the acquisition of system information related to the Sidelink Direct Discovery may be configured as a measurement purpose. The number of measurement identifiers to be configured where the acquisition of the system information related to the Sidelink Direct Discovery is configured as the measurement purpose, may be configured to be only one at the maximum.

The terminal device 1 having received measurement configuration, in a case where the measurement identifiers of the measurement configuration retained by the terminal device 1 has the same entry as the measurement identifiers included in a measurement identifiers addition/change list of the received measurement configuration, replace the retained value with the received value. Otherwise, the received value is added as a new entry to the measurement configuration retained by the terminal device 1.

In a case that an entry of measurement reporting corresponding to the above-mentioned measurement identifiers is retained, the stated entry is deleted.

Then, when a timer for periodic reporting (e.g., the timer (T321) used in acquiring the cell global identifier, a timer (T322), to be explained later, used in acquiring system information related to the Sidelink Direct Discovery, or the like) is performing time counting, the timer is stopped and the information about this measurement identifier is reset.

In the reporting configuration corresponding to this measurement identifier, in a case that the periodical measurement is configured as a trigger type, and the acquisition of system information related to the Sidelink Direct Discovery is a measurement purpose, time counting of the timer (T322) is started with a predetermined value for this measurement identifier.

The terminal device 1 measures the respective measurement identifiers as follows. In the reporting configuration corresponding to the measurement identifier, in a case that the acquisition of system information related to the Sidelink Direct Discovery is a measurement purpose, the terminal device 1 performs measuring, when needed, using an Autonomous gap at a frequency indicated by the corresponding measurement object. The terminal device 1 may attempt to acquire system information related to the Sidelink Direct Discovery of a cell (a global cell ID, Discovery reception resource pool, and/or Discovery configuration, or the like) indicated by a first parameter (cell information for monitoring the Sidelink Direct Discovery) included in the measurement configuration. In place of this, the terminal device 1 may attempt to acquire, by performing cell selection at a frequency included in the related measurement configuration for a cell selection, the system information related to the Sidelink Direct Discovery from the selected cell. A period of time of the Autonomous gap may be configured with the value of the timer (T322). The terminal device 1 may use an available idle time for the above-discussed measurement. The terminal device 1 may not use an available idle time for the above-discussed measurement instead.

Alternatively, in the reporting configuration corresponding to the measurement identifier, in a case that the measurement purpose is to acquire the cell global identifier and the reporting configuration includes a request to acquire system information related to the Sidelink Direct Discovery, the terminal device 1 may perform measuring, when needed, using the Autonomous gap at a frequency indicated by the corresponding measurement object. In addition, the terminal device 1 may attempt to acquire system information related to the Sidelink Direct Discovery of the cell. The period of time of the Autonomous gap may be configured with the value of the timer (T321). The terminal device 1 may use an available idle time for the above-discussed measurement. The terminal device 1 may not use an available idle time for the above-discussed measurement instead.

In a case where, to each of the measurement identifiers, the related reporting configuration is such that the measurement purpose is to make a report on the monitoring of a Sidelink Direct Discovery announcement, the terminal device 1 may configure (consider) that any neighboring cell having a physical cell identity that is detected at the related frequency and matches a value indicated by the first parameter contained in the corresponding measurement object is included (is applicable) in the measurement reporting.

In a case where the system information related to the Sidelink Direct Discovery is acquired during the time counting of the predetermined timer (T322, T321, or the like) or the time counting of the predetermined timer has expired, the measurement reporting procedure is triggered (step S307). The measurement reporting procedure may be triggered under another condition based on another reporting configuration. The above-mentioned timer (T322) starts time counting in a case where the measurement configuration configured in the terminal device 1 includes a reporting configuration that is configured to indicate that the measurement purpose is to acquire system information related to the Sidelink Direct Discovery, and stops the stated timer in a case where the system information related to all the Sidelink Direct Discovery necessary for reporting has been acquired. When the time counting of the above timer expires, the measurement reporting procedure may be initiated, the related measurement may be stopped, and the corresponding measurement configuration identifier may be deleted. For the sake of convenience of description, although the timer is called the timer (T322) as the name of the timer, other names do not affect operations of the terminal device 1, the base station device 2, and the like in the present embodiment in any way.

The terminal device 1, when the measurement reporting procedure is triggered, includes a measurement result (reception power and reception quality) of a serving cell (PCell) in the measurement reporting. In a case where at least one applicable neighboring cell to be reported is present, the terminal device 1 includes best neighboring cells to the maximum number in a neighboring cell measurement result; in a case where the measurement purpose is to report on the monitoring of the Sidelink Direct Discovery announcement and Cell Global Identifier (CGI) information with respect to the cell indicated by the physical cell identity (first parameter) reported from the base station device in the related measurement object has been acquired, when the stated cell broadcasts configuration information on the monitoring of the Sidelink Direct Discovery announcement, the terminal device 1 may include the configuration information on the monitoring of the acquired Sidelink Direct Discovery announcement in the measurement reporting.

Further, the terminal device 1, in a case that the first parameter is not included in the reporting configuration, may include, in the measurement reporting, configuration information on the monitoring of the Sidelink Direct Discovery announcement acquired successfully by any one of the cells detected at a frequency indicated by the measurement object that is linked to the measurement identifier.

The measurement result may include time shift information (System Frame Number (SFN) and/or subframe offset information) between the measured cell and a serving cell (Primary Cell (PCell) or a Secondary Cell (SCell)).

The terminal device 1, in the case where the reporting configuration is such that the measurement purpose is to report on the monitoring of the Sidelink Direct Discovery announcement, may include, in the measurement reporting, information by which it can be recognized that system information about the Sidelink Direct Discovery announcement monitoring was not received in the measurement object cell and all or part of the information on the monitoring is not present in the system information related to the Sidelink Direct Discovery having been acquired in the measurement object cell.

The terminal device 1 transmits measurement reporting to the base station device 2 (step S308), and the base station device 2 receives the measurement reporting (step S309). The base station device 2 may configure a period of time (gap) for monitoring (or announcement) of the Sidelink Direct Discovery announcement, instruct the handover, or the like to the terminal device 1 based on the information related to the Sidelink Direct Discovery included in the measurement reporting.

In a case where it is configured in a higher layer to monitor the Sidelink Direct Discovery announcement, the terminal device 1 capable of Sidelink Direct Discovery performs the following processing with respect to respective frequencies configured so that the terminal device 1 monitors the Sidelink Direct Discovery announcement while prioritizing frequencies included in the inter-frequency Discovery frequency list contained in SIB19. When the monitoring of the Sidelink Direct Discovery announcement at the above frequency does not affect regular processing (for example, during an idle time, the reception being performed using a spare receiver, or the like), or when a Sidelink Direct Discovery gap is configured at the stated frequency, a lower layer is configured so that the monitoring of the Sidelink Direct Discovery announcement is performed using a resource pool indicated by the Discovery reception resource pool of SIB19 (for example, the terminal device 1 performs monitoring) (step S310).

Note that the above-described procedure represents merely an example of the procedure, and it is not absolutely necessary to carry out all the steps.

For example, when the base station device 2 received the Sidelink UE information from the terminal device 1 and necessary measurement has already been configured to the terminal device 1, the processing of step S302 need not be carried out.

Further, for example, the base station device 2 may carry out the processing of step S305 without carrying out the processing from step S302 to step S304, based on the Sidelink UE information of step S301. In this case, for example, the base station device 2 may configure, to the measurement object of the measurement configuration, a predetermined value as a physical cell identity of the cell to be measured, or may not configure the physical cell identity of the cell to be measured. In the latter case, the terminal device 1 may acquire information related to the Sidelink Direct Discovery of any one of the cells detected at the measurement object frequency.

The terminal device 1 of the present embodiment can notify the base station device 2 of whether a gap is needed in the measurement for Sidelink Direct Discovery announcement monitoring. Further, the terminal device 1 can receive the measurement configuration for acquiring the system information related to the Sidelink Direct Discovery announcement monitoring, from the base station device. Furthermore, the terminal device 1 can report, to the base station device 2, the measurement reporting including the system information related to the Sidelink Direct Discovery announcement monitoring. This makes it possible for the terminal device 1 to perform efficient Sidelink Direct Discovery announcement monitoring based on the terminal capability of the terminal device 1.

The base station device 2 of the present embodiment can receive, from the terminal device 1, information indicating whether a gap is needed in the measurement for Sidelink Direct Discovery announcement monitoring. Further, the base station device 2 can report, to the terminal device 1, the measurement configuration for acquiring the system information related to the Sidelink Direct Discovery announcement monitoring. Furthermore, the base station device 2 can acquire the system information related to the Sidelink Direct Discovery announcement monitoring of another cell measured by the terminal device 1. This makes it possible for the base station device 2 to perform efficient scheduling in consideration of the Sidelink Direct Discovery announcement monitoring of the terminal device 1.

Second Embodiment

A second embodiment of the present invention will be described below.

In the first embodiment, described is the procedure in which system information related to Sidelink Direct Discovery announcement monitoring is acquired from another cell. In the present embodiment, described is an example of processing in a case where SLSS transmitted by another terminal device 1 is detected in the measurement of a frequency at which Sidelink Direct Discovery announcement monitoring is performed.

Because the terminal device 1 and the base station device 2 used in the present embodiment are the same as those in the first embodiment, detailed description thereof is omitted.

Further, a procedure in which the terminal device 1 performs Sidelink Direct Discovery announcement monitoring is also the same as the procedure having been discussed with reference to FIG. 3 in the first embodiment, and thus detailed description thereof will be omitted.

In step S303 in FIG. 3, the terminal device 1 having received SLSS transmitted by the another terminal device 1 may report an SLSS ID to the base station device 2. For example, the Sidelink UE information is reported including information related to the Sidelink Direct Discovery announcement monitoring used when taking the SLSS ID and/or the stated SLSS as a synchronization source. The information related to the Sidelink Direct Discovery announcement monitoring in this case may be, for example, information configured beforehand by the terminal device 1, or may be broadcast from the terminal device 1 that transmits SLSS. Alternatively, the above-mentioned information may be included in the measurement reporting, or may be reported with another RRC message. With this, because the base station device 2 can configure, to the terminal device 1, a gap for monitoring even in a case of a synchronization source of the Sidelink Direct Discovery being the terminal device 1, it is possible to give opportunity to perform Sidelink Direct Discovery announcement monitoring of the terminal device 1.

Alternatively, instead of reporting the SLSS ID, the transmission of the Sidelink UE information in the first embodiment may be triggered assuming that the synchronization source has been changed. This makes it possible for the base station device 2 to recognize a change in the reception state at the Sidelink Direct Discovery frequency of the terminal device 1.

In step S307 in FIG. 3, when SLSS transmitted by such another terminal device 1 is received, the SLSS ID may be reported to the base station device 2. For example, the measurement reporting is reported, to the base station device 2, including information related to the Sidelink Direct Discovery announcement monitoring used when taking the SLSS ID and/or the stated SLSS as a synchronization source. The information related to the Sidelink Direct Discovery announcement monitoring in this case may be, for example, information configured beforehand by the terminal device 1, or may be broadcast from the terminal device 1 that transmits SLSS. With this, because the base station device 2 can configure, to the terminal device 1, a gap for monitoring even in a case of a synchronization source of the Sidelink Direct Discovery being the terminal device 1, it is possible to give opportunity to perform Sidelink Direct Discovery announcement monitoring of the terminal device 1.

In the aforementioned embodiments, the system information related to the Sidelink Direct Discovery may be information included in the System information block Type 19 as the existing system information, or a newly provided System information block may be used. Likewise, the system information related to the Sidelink Direct communication may be information included in a System information block Type 18 as the existing system information, or a newly provided System information block may be used.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even when the actual applied names differ from the names in the embodiments of the present invention, the spirit of the invention claimed in the embodiments of the present invention is not affected in any way.

The term "entity" used in the embodiments may be considered to have the same meaning as "sublayer". In other words, the RRC entity, PDCP entity, RLC entity, and MAC entity can be explained while being replaced with an RRC sublayer, PDCP sublayer, RLC sublayer, and MAC layer, respectively.

The term "connection" used in the respective embodiments is not limited to the configuration in which a certain device and another device are directly connected using a physical line, and includes a configuration in which the devices are logically connected, a configuration in which the devices are radio-connected using the same radio technology or different radio technologies, and the like.

The content described using the specific numerical value is merely an example of a numerical value used for the sake of the description, and any suitable value may be applied.

The terminal device 1 refers to devices including not only portable or movable mobile station devices, but also stationary or not-movable electronic devices installed inside or outside a building and equipped with a communication function, for example, such as an AV device, a kitchen device, a cleaner, a washing machine, an air-conditioner, an office device, an automatic vending machine, other everyday life devices, a measurement device, an on-vehicle device, a wearable device capable of being worn by a user, a healthcare device, and the like. Further, the terminal device 1 may be used for the communication not only between human beings or between a human being and a device, but also between devices (Machine Type Communication), between a vehicle and a human being, between vehicles, or between a construction on a road and a vehicle (between road vehicles).

The terminal device 1 is also called a user terminal, a mobile station device, a communication terminal, a mobile device, a terminal, User Equipment (UE), and a Mobile Station (MS). The base station device 2 is also called a radio base station device, a base station, a radio base station, a fixed station, a NodeB (NB), an evolved NodeB (eNB), a Base Transceiver Station (BTS), and a Base Station (BS).

The base station device 2 is referred to as NB in UMTS defined by 3GPP, and is referred to as eNB in EUTRA and Advanced EUTRA. The terminal device 1 in UMTS defined by 3GPP, EUTRA, and Advanced EUTRA is referred to as UE.

For the sake of convenience of description, methods, means, or algorithm steps to implement the respective functions or part of the functions of the terminal device 1 and the base station device 2 are specifically combined and described using the functional block diagrams; however, these can be directly implemented by software modules performed by hardware and a processor or constituent elements obtained by combining the above.

In a case of being installed by hardware, the terminal device 1 and the base station device 2 may include, in addition to the configuration of the block diagrams having been discussed, a power supply unit and a battery supplying power to the terminal device 1 and the base station device 2, a display unit of liquid crystal or the like, a display driving unit, a memory, an input-output interface, input-output terminals, a speaker, and combination of other peripheral devices.

In a case of being installed by software, the functions thereof are retained as one or more instructions or code on a computer-readable medium, or can be transmitted. The computer-readable medium includes both computer recording media and communication media including a medium that assists carriage of a computer program from a certain place to another place.

The terminal device 1, the base station device 2, and the like may be controlled by recording one or more instructions or code in a computer-readable recording medium, and making a computer system read in and perform the one or more instructions or the code recorded in the recording medium. The "computer system" here includes an OS and hardware components such as a peripheral device.

The operations described in the respective embodiments of the present invention may be implemented by programs. The programs run on the terminal device 1 and the base station device 2 related to the embodiments of the present invention are a program (a program that makes the computer function) configured to control a CPU and the like so as to enable the functions of the above-described embodiments related to the embodiments of the present invention. The information handled by these devices is temporarily held in RAM at the time of processing, is then stored in various types of ROMs and HDDs, and is read out by CPU as necessary to be corrected and written.

In addition to realizing the functions of the above-described embodiments by performing programs, the functions of the embodiments of the present invention are enabled in some cases by the programs running cooperatively with an operating system, other application programs, or the like in accordance with instructions included in those programs.

Furthermore, the "computer-readable recording medium" refers to a portable medium such as a semiconductor medium (e.g., RAM, a non-volatile memory card, or the like), an optical recording medium (e.g., DVD, MO, MD, CD, BD, or the like), a magnetic recording medium (e.g., a magnetic tape, flexible disk, or the like), and a storage device such as a disk unit built into the computer system. Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client.

Furthermore, the program may be configured to enable some of the functions described above, and additionally may be configured to enable the functions described above in combination with a program already recorded in the computer system.

The respective functional blocks or features of the terminal device 1 and the base station device 2 used in the above-discussed embodiments can be installed or performed by a general-purpose processor designed to perform the functions described in this specification, a digital signal processor (DSP), an application specific integrated circuit (ASIC) or an arbitrary integrated circuit (IC) for general use, a field programmable gate array signal (FPGA), other programmable logic devices, discrete gates or transistor logic, discrete hardware components, or constituent elements obtained by combining the above.

Furthermore, some or all portions of the functional blocks or features of each of the terminal device 1 and the base station device 2 according to the above-described embodiments may be enabled (performed) as an electric circuit designed to exhibit at least the functions described in this specification, that is, as an LSI that is typically an integrated circuit, or may be enabled (performed) as a chip set. The chip set may have a configuration including other components such as an antenna, passive components, and the like. The functional blocks of the terminal device 1 and the base station device 2 may be individually enabled as a chip, or some or all of the functional blocks may be integrated into a chip. The circuit integration technique is not limited to LSI, and the integrated circuits for the functional blocks may be enabled by dedicated circuits or a general-purpose processor. Furthermore, when advances in semiconductor technology achieve circuit integration technologies that replace LSIs, such integrated circuits based on the circuit integration technologies are applicable.

Although the general-purpose processor may be a microprocessor, the processor may be a processor of known type, a controller, a micro-controller, or a state machine instead. The general-purpose processor or the above-mentioned circuits may include of digital circuits, may include analog circuits, or may include both of them.

Further, the processor may be installed while combining computing devices. For example, the processor may include a DSP and a microprocessor, multiple processors, one or more microprocessors connected with a DSP core, or another component combining the above configurations.

SUMMARY

The terminal device in the embodiments of the present invention, in a case where, with respect to each configured measurement identifier, a measurement purpose included in the related reporting configuration is to report on monitoring of Sidelink Direct Discovery announcement and a first parameter is included in the reporting configuration, performs measuring at a frequency indicated by a measurement object linked to the measurement identifier using an Autonomous gap, and attempts to acquire configuration information on the monitoring of the Sidelink Direct Discovery announcement of a cell indicated by the first parameter by acquiring system information being broadcast in the cell.

Further, in the terminal device in the embodiments of the present invention, in a case where the first parameter is not included in the reporting configuration, the terminal device performs measuring at the frequency indicated by the measurement object linked to the measurement identifier using the Autonomous gap, and attempts to acquire the configuration information on the monitoring of the Sidelink Direct Discovery announcement of the cell detected at the above-mentioned frequency by acquiring the system information being broadcast in the cell.

The base station device in the embodiments of the present invention configures reporting on the monitoring of Sidelink Direct Discovery announcement as a measurement purpose included in the related reporting configuration with respect to a measurement identifier configured in the terminal device, and includes the first parameter in the reporting configuration, so as to make the terminal device perform measuring at a frequency indicated by the measurement object linked to the measurement identifier using the Autonomous gap, and acquire the configuration information on the monitoring of the Sidelink Direct Discovery announcement of the cell indicated by the first parameter from the system information being broadcast in the cell.

In the communication system in the embodiments of the present invention, the base station device, configures, with respect to a measurement identifier configured in the terminal device, reporting on the monitoring of Sidelink Direct Discovery announcement as a measurement purpose included in the related reporting configuration, and includes the first parameter in the reporting configuration; the terminal device, in the case where, with respect to each configured measurement identifier, the measurement purpose included in the related reporting configuration is to report on the monitoring of the Sidelink Direct Discovery announcement and the first parameter is included in the reporting configuration, performs measuring at a frequency indicated by the measurement object linked to the measurement identifier using the Autonomous gap, and attempts to acquire configuration information on the monitoring of the Sidelink Direct Discovery announcement of a cell indicated by the first parameter, by acquiring system information being broadcast in the cell.

The measurement method for the terminal device in the embodiments of the present invention, in a case where, with respect to each configured measurement identifier, a measurement purpose included in the related reporting configuration is to report on monitoring of Sidelink Direct Discovery announcement and a first parameter is included in the reporting configuration, includes at least the steps of measuring at a frequency indicated by a measurement object linked to the measurement identifier using an Autonomous gap, and attempting to acquire configuration information on the monitoring of the Sidelink Direct Discovery announcement of a cell indicated by the first parameter, by acquiring system information being broadcast in the cell.

The integrated circuit to be implemented in the terminal device in the embodiments of the present invention, in the case where, with respect to each configured measurement identifier, the measurement purpose included in the related reporting configuration is to report on the monitoring of Sidelink Direct Discovery announcement and the first parameter is included in the reporting configuration, makes the terminal device exhibit a function to perform measuring at a frequency indicated by the measurement object linked to the measurement identifier using the Autonomous gap, and a function to attempt to acquire the configuration information on the monitoring of the Sidelink Direct Discovery announcement of a cell indicated by the first parameter, by acquiring the system information being broadcast in the cell.

Thus far, the embodiments of the present invention have been described in detail based on the specific examples; however, it is apparent that the spirit of each of the embodiments of the present invention and the scope of the aspects of the present invention are not limited to these specific examples, and design changes within a range that does not depart from the spirit of the present invention are also included in the invention. In other words, this specification of the present application is described for the purpose of illustration, and puts no limitation on the embodiments of the present invention.

Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

CROSS-REFERENCE TO RELATED APPLICATION

The present application claims priority of JP 2015-156694, filed on Aug. 7, 2015, and all the contents thereof are included herein by the reference.

REFERENCE SIGNS LIST

1 Terminal device
2, 2-1, 2-2 Base station device
101, 201 Reception unit
102, 202 Demodulation unit
103, 203 Decoding unit
104, 204 Reception data control unit
105, 205 Physical layer control unit
106, 206 Transmission data control unit
107, 207 Coding unit
108, 208 Modulation unit
109, 209 Transmission unit
110, 210 Radio resource control unit
111 Measurement unit
211 Network signal transmission and/or reception unit

The invention claimed is:

1. A terminal device comprising:

receiving circuitry configured to receive, with use of a first frequency, a message including first configuration related to a Sidelink Direct Discovery, the first configuration including frequency information indicating a second frequency different from the first frequency;

controlling circuitry configured to start a timer with a predetermined value; and transmitting circuitry configured to trigger a reporting procedure to report configuration information while the timer is running, the timer being a timer used to allow to trigger the reporting procedure, wherein the receiving circuitry is further configured to acquire the configuration information from system information, the system information being broadcasted in the second frequency indicated by the frequency information, and the configuration information indicates a Discovery reception resource pool for a Sidelink Direct Discovery announcement monitoring.

2. A base station device comprising:

transmitting circuitry configured to transmit, with use of a first frequency, a message including first configuration related to a Sidelink Direct Discovery, the first configuration including frequency information indicating a second frequency different from the first frequency; and receiving circuitry configured to receive configuration information transmitted by a terminal device based on a reporting procedure triggered by the terminal device, wherein the reporting procedure is triggered by the terminal device while a timer started by the terminal device is running, the timer being a timer used to allow the terminal device to trigger the reporting procedure, and the configuration information is acquired from system information which is broadcasted in the second frequency indicated by the frequency information, and the configuration information indicates a Discovery reception resource pool for a Sidelink Direct Discovery announcement monitoring.

3. A method performed by a terminal device comprising:

receiving, with use of a first frequency, a message including first configuration related to a Sidelink Direct Discovery, the first configuration including frequency information indicating a second frequency different from the first frequency;

starting a timer with a predetermined value;

triggering a reporting procedure to report configuration information while the timer is running, the timer being a timer used to allow to trigger the reporting procedure; and acquiring the configuration information from system information, the system information being broadcasted in the second frequency indicated by the frequency information, wherein the configuration information indicates a Discovery reception resource pool for a Sidelink Direct Discovery announcement monitoring.

4. A method performed by a base station device comprising:

transmitting, with use of a first frequency, a message including first configuration related to a Sidelink Direct Discovery, the first configuration including frequency information indicating a second frequency different from the first frequency; and receiving configuration information transmitted by a terminal device based on a reporting procedure triggered by the terminal device, wherein the reporting procedure is triggered by the terminal device while a timer started by the terminal device is running, the timer being a timer used to allow the terminal device to trigger the reporting procedure, and the configuration information is acquired from system information which is broadcasted in the second frequency indicated by the frequency information, and the configuration information indicates a Discovery reception resource pool for a Sidelink Direct Discovery announcement monitoring.

* * * * *